United States Patent [19]

Newsome

[11] Patent Number: 6,028,977
[45] Date of Patent: *Feb. 22, 2000

[54] ALL-OPTICAL, FLAT-PANEL DISPLAY SYSTEM

[75] Inventor: Edward E. Newsome, McLean, Va.

[73] Assignee: Moriah Technologies, Inc., McLean, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/745,941

[22] Filed: Nov. 8, 1996

Related U.S. Application Data

[60] Provisional application No. 60/006,565, Nov. 13, 1995, and provisional application No. 60/025,653, Sep. 9, 1996.

[51] Int. Cl.$^7$ .................................................. G09G 3/22

[52] U.S. Cl. ..................... 385/147; 250/330; 250/484.4; 313/498; 345/81; 385/17; 385/901

[58] Field of Search ................................ 385/15–17, 115, 385/147, 901; 250/330, 483.1, 484.2, 484.4; 313/483, 498, 505, 510; 345/55, 81, 84; 40/542–544

[56] References Cited

U.S. PATENT DOCUMENTS

| | | | |
|---|---|---|---|
| 3,754,988 | 8/1973 | Barnes | 385/17 X |
| 3,848,245 | 11/1974 | Marshall | 250/330 X |
| 3,916,245 | 10/1975 | Dorf et al. | 313/486 |
| 4,185,229 | 1/1980 | Yoshikawa et al. | 315/169.4 |
| 4,429,303 | 1/1984 | Aboelfotoh | 345/72 |
| 4,578,709 | 3/1986 | Lang et al. | 348/197 |
| 5,003,179 | 3/1991 | Pollack | 250/483.1 |
| 5,245,623 | 9/1993 | McFarlane | 372/69 |
| 5,290,730 | 3/1994 | McFarlane et al. | 437/129 |
| 5,379,311 | 1/1995 | McFarlane et al. | 372/41 |
| 5,405,710 | 4/1995 | Dodabalapur et al. | 313/505 X |
| 5,469,020 | 11/1995 | Herrick | 40/542 X |

OTHER PUBLICATIONS

Lewis et al., "A True Three–Dimensional Display" IEEE, vol. ED–18, No. 9, Sep. 1971 (724–732 pp.).

Masao Kawachi, "Silica waveguides on silicon and their application to integrated–optic components", Optical and Quantum . . . , 22 (1990) (pp. 391–416).

*Primary Examiner*—John D. Lee
*Attorney, Agent, or Firm*—James C. Wray; Meera P. Narasimhan

[57] ABSTRACT

An all-optical flat panel display system is based on the generation of photoluminescence within a doped, optical waveguide display matrix. Color photoluminescence is produced through an infrared, two-step photonic upconversion process and the subsequent radiative emission process. Established principles of solid-state laser design and electronic upconversion in a host glass substrate are applied. The present photoluminescent display technology provides for flat-panel display systems having luminous output efficiencies approaching 67 lumens/Watt. That efficiency increase results from employing efficient, innovative photoluminescent phosphors and from an optical cavity architecture which enhances the three physical process (row excitation, column excitation and spontaneous output emission) operating inside the pixel. The present system is thinner, lighter weight, more power efficient and more cost competitive to produce than existing technologies. Further advantages realized by the present system include high readability in varying lighting conditions, viewing angle independence, size scalability without brightness and color quality sacrifice, rugged solid-state construction, vibration and thermal insensitivity and size independence. The present invention has potential applications in military, personal computing and digital HDTV systems, multi-media, medical and broadband imaging displays and large-screen display systems. Defense applications may range from full-color, high-resolution, see-through binocular displays to 60 inch digital command center displays.

37 Claims, 23 Drawing Sheets

General Channel Guide:

Buried Channel Guide:

Embedded Strip:

n: Index of medium
$n_{||}$: Index of lateral layer

PRIOR ART

50 μm

PRIOR ART

— cladding (over-cladding)
--- buffer (under-cladding)
— Si substrate

PRIOR ART

— $SiO_2$-$TiO_2$ core
— $SiO_2$ buffer
— Si substrate

↓ Consolidation

↓ RIE

↓ FHD + Consolidation (A) Proof-of-Principle: 1x1 Display
  · Single Mode
  · Multi-Mode (B) Guided-Wave: 2x2 Matrix Display
  · Single Mode
  · Multi-Mode

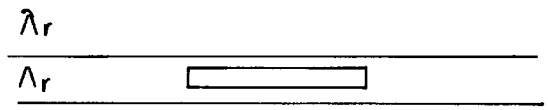
FIG. 21
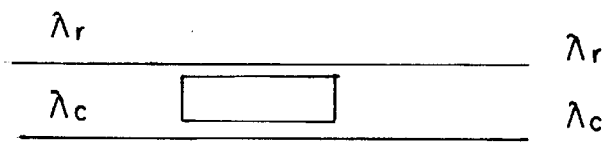
FIG. 22
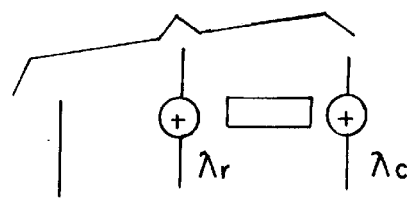
FIG. 23
FIG. 24
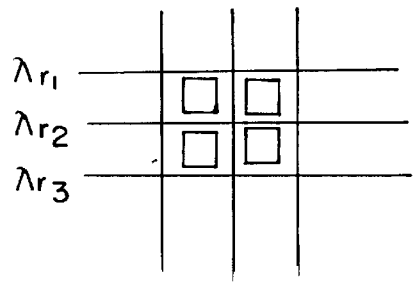
FIG. 25
FIG. 26
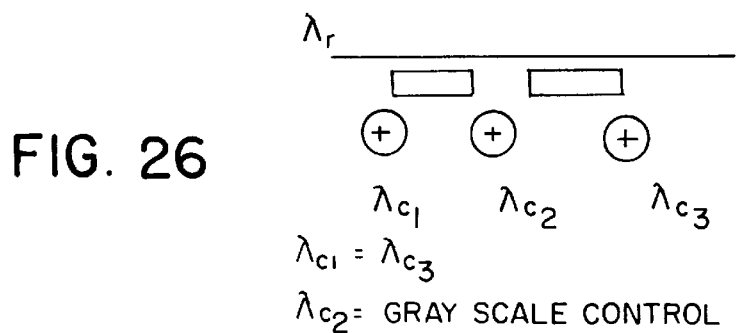
$\lambda_{c_1} = \lambda_{c_3}$
$\lambda_{c_2}$ = GRAY SCALE CONTROL

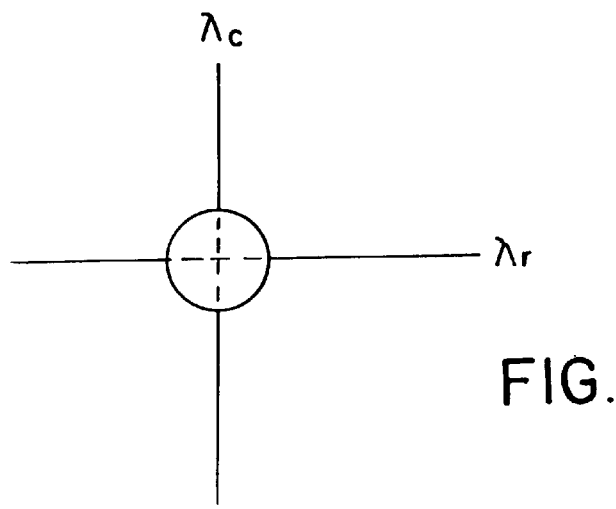
FIG. 27
FIG. 28
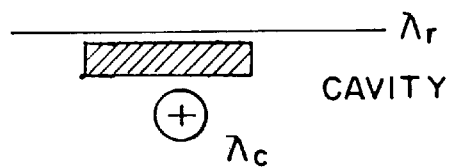
FIG. 29
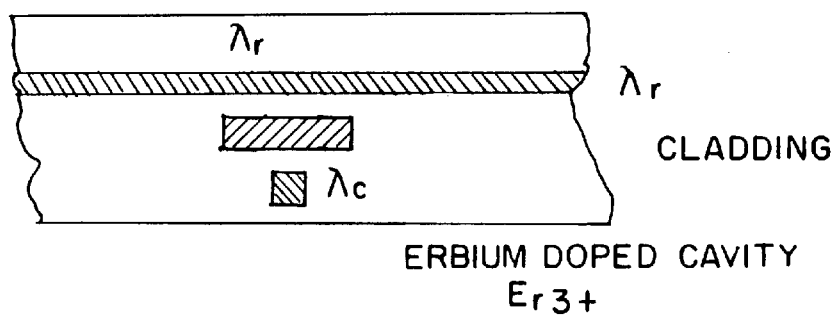

- Core : 3 - 10 μm
- Metalization : Angstroms (approx.)
- Cell Length : 10 μm - 675 μm
- Cell Width : 10 μm - 675 μm
- $T_{3\mu m}$= .99745, $T_{10\mu m}$= .99896

FIG. 35

| | | | | |
|---|---|---|---|---|
| Power Requirements : | | | | |
|   Total Display Output Power : | 200 | 200 | 200 | candela / square_meter |
| | 3.68 | 3.68 | 3.68 | watts / square_meter |
| Pixel Parameters : | | | | |
|   Pixels per Row : | 640 | 640 | 640 | pixels / row |
|   Pixels per Column : | 480 | 480 | 480 | pixels / column |
|   Pixel Height : | 675 | 675 | 675 | micrometers |
|   Pixel Width : | 675 | 675 | 675 | micrometers |
|   *Pixel Depth (Active Layer)* : | 3 | 2 | 1 | micrometers |
|   Pixel Transverse Area : | 2,025 | 1,350 | 675 | square _ micrometer |
| Display Physical Attributes : | | | | |
|   Display Height : | 17 | 17 | 17 | inches |
|   Display Width : | 13 | 13 | 13 | inches |
|   Diagonal Dimensions : | 21 | 21 | 21 | inches |
| *Total Display Output* : | 515E - 03 | 515E - 03 | 515E - 03 | watts |
|   Output Power per Pixel : | 1.68E - 06 | 1.68E - 06 | 1.68E - 06 | watts / pixel |
|   Pixel Power Density : | 1.23 | 1.84 | 3.68 | watts / cubic _ centimeter |
| Laser Driver Attributes : | | | | |
|   Input Power per Pixel : | 5.62E - 06 | 4.61E - 06 | 3.35E - 06 | watts / pixel |
|   *Peak Intensity Enhancement* : | 2134 | 2134 | 2134 | |
|   Min. Cavity Reflectivity : | 98.5 % | 98.5 % | 98.5 % | |
|   *Peak Laser Power* : | 1.73 | 1.42 | 1.03 | watts |
|   *Total Peak Display Power* : | 3.45 | 2.83 | 2.06 | watts |
|   *Max. Pixel Efficiency ( % )* : | 15 % | 18 % | 25 % | |
|   *Max. Pixel Efficiency* : | 102 | 124 | 171 | lumens / watt |
| Display System Efficiency : | | | | |
|   Total System Efficiency : | 40 | 49 | 67 | lumens / watt |
|   Total System Power : | 8.80 | 7.23 | 5.26 | watts |

Efficiency Assumptions :
  Lasers, Coupling, & Wall Plug Efficiency : 50 %
  Waveguide Transmission Efficiency : 98 %
  Extraction Efficiency : 80 %

Materials Assumptions :
  Metastable Lifetime : 10 msec
  Ion Concentration : $10 \times 10^{20}$ ions / cm$^3$

FIG.36

| | | | | |
|---|---|---|---|---|
| Power Requirements : | | | | |
| Total Display Output Power : | 200 | 200 | 200 | Candela / square_meter |
| | 3.68 | 3.68 | 3.68 | watts / square_meter |
| Pixel Parameters | | | | |
| Pixels per Row : | 640 | 640 | 640 | pixels / row |
| Pixels per Column : | 480 | 480 | 480 | pixels / column |
| Pixel Height : | 50 | 50 | 50 | micrometers |
| Pixel Width : | 50 | 50 | 50 | micrometers |
| *Pixel Depth (Active Layer)* : | 3 | 2 | 1 | micrometers |
| Pixel Transverse Area : | 150 | 100 | 50 | square _ micrometer |
| Display Physical Attributes : | | | | |
| Display Height : | 1.3 | 1.3 | 1.3 | inches |
| Display Width : | 0.9 | 0.9 | 0.9 | inches |
| Diagonal Dimensions : | 1.6 | 1.6 | 1.6 | inches |
| *Total Display Output* : | 283E - 05 | 283E - 05 | 283E - 05 | watts |
| Output Power per Pixel : | 9.20E - 09 | 9.20E - 09 | 9.20E - 09 | watts / pixel |
| Pixel Power Density : | 1.23 | 1.84 | 3.68 | watts / cubic _ centimeter |
| Laser Driver Attributes : | | | | |
| Input Power per Pixel : | 1.48E - 07 | 1.20E - 07 | 8.51E - 08 | watts / pixel |
| *Peak Intensity Enhancement* : | 3528 | 3528 | 3528 | |
| Min. Cavity Reflectivity : | 98.5 % | 98.5 % | 98.5 % | |
| *Peak Laser Power* : | 0.05 | 0.04 | 0.03 | watts |
| *Total Peak Display Power* : | 0.09 | 0.07 | 0.05 | watts |
| *Max. Pixel Efficiency ( % )* : | 3 % | 4 % | 5 % | |
| *Max. Pixel Efficiency* : | 21 | 26 | 37 | lumens / watt |
| Display System Efficiency : | | | | |
| Total System Efficiency : | 8 | 10 | 14 | lumens / watt |
| Total System Power : | 0.23 | 0.19 | 0.13 | watts |
| Efficiency Assumptions : | | | | |

Lasers, Coupling, & Wall Plug Efficiency : 50 %
Waveguide Transmission Efficiency : 98 %
Extraction Efficiency : 80 %

Materials Assumptions :

Metastable Lifetime : 10 msec
Ion Concentration : $50 \times 10^{20}$ ions / cm$^3$

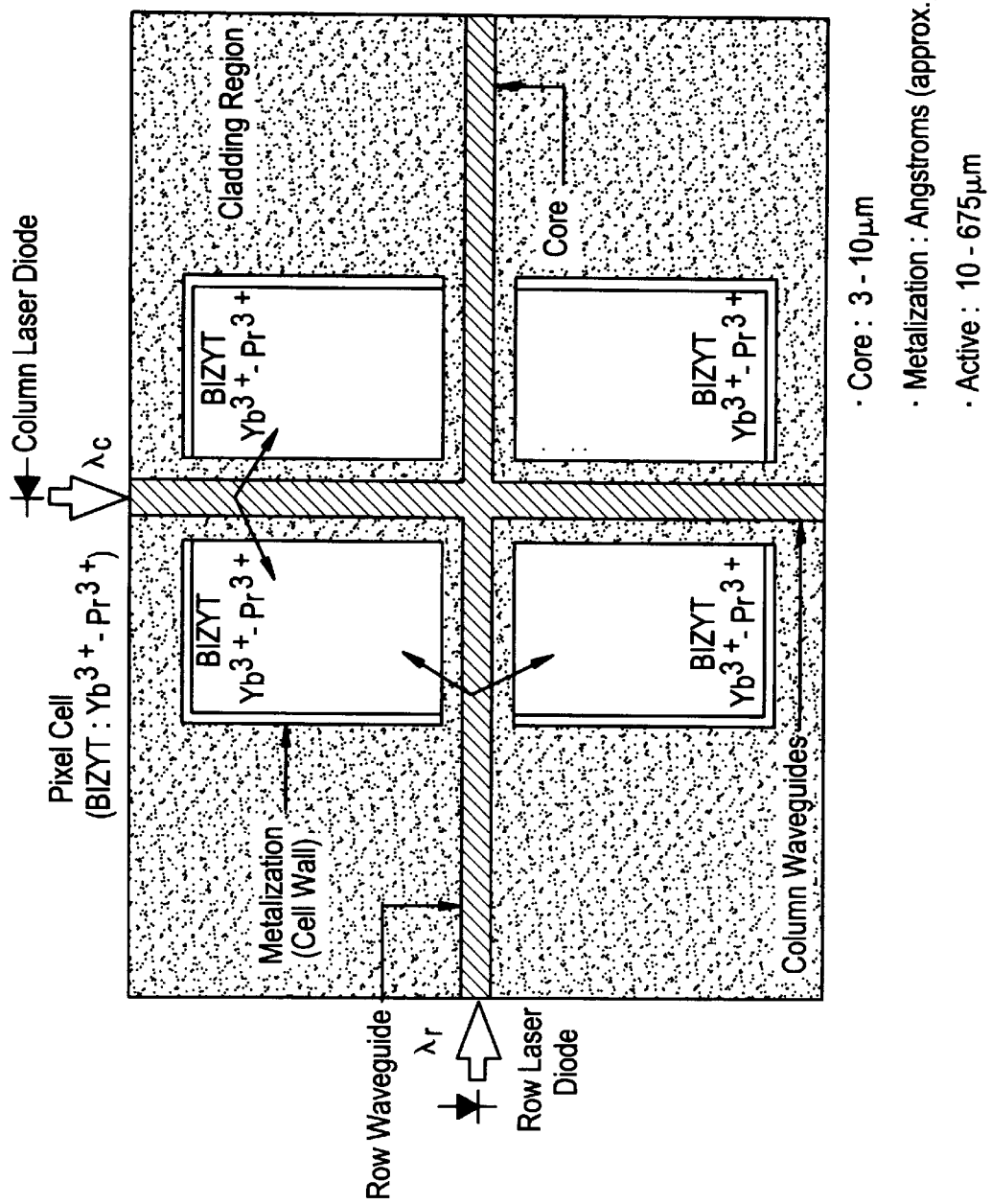

ALL-OPTICAL, FLAT-PANEL DISPLAY SYSTEM

This application claims the benefit of U.S. Provisional application Nos. 60/006,565, filed Nov. 13, 1995 and 60/025,653 filed Sep. 9, 1996.

BACKGROUND OF THE INVENTION

The present invention relates to emissive displays which convert electrical energy to luminous energy as a function of the image signal.

Major technologies for emissive displays include cathodoluminescence and electroluminescence. Cathodoluminescence, which is excitation arising from bombardment with a beam of electrons, is used in CRT-display systems. Electroluminescence, which is excitation resulting from the application of an ac or dc electric field, is used in electroluminescent displays, while other sources of light, such as photoluminescence, chemiluminescence and bioluminescence, exist, existing displays implementing those technologies are not acceptable, as limitations in addressability, reversibility, switching time and luminous efficiency hinder effective operation. Needs exist for display systems that eliminate or minimize the limitations encountered during the use of alternative light source technologies.

Currently, three flat-panel technologies exist: active matrix liquid crystal display systems, alternating current thin film electroluminescent systems and alternating current gas plasma systems.

Liquid crystal systems are generally lightweight, power efficient and have excellent full sunlight performance. Disadvantages realized by those systems include poor contrast, narrow viewing angles and slow reaction times. Active matrix liquid crystal displays (AMLCD) overcome some of those shortcomings by using thin-film transistors placed at each pixel. That allows for faster response times, improved contrast, wider viewing angles and superb color. Unfortunately, AMLCD has a set of associated problems, including sensitivity to environmental conditions of temperature and vibration, complex and expensive construction costs and unacceptable scalability.

Electroluminescent systems offer many advantages, including solid-state construction, inherent ruggedness and reliability, high contrast and luminance, broad viewing angles, simple pixel addressing control, high resolution and, relative to plasma display systems, are lightweight and power efficient. Electroluminescent systems, however, have poor scalability. In addition, full-color video operation support is difficult to provide using electroluminescent systems, as difficulties exist in finding blue phosphors for providing proper color saturation and luminance.

Gas plasma systems offer many advantages, including improved scalability, full color and full gray scale characteristics with wide viewing angles and solid-state construction. Those systems, however, are generally heavy and have high power consumptions, short life expectancies, limited resolution and fuzzy images.

Needs exist for display systems that offer the advantages of existing systems without realizing the limitations of those systems.

SUMMARY OF THE INVENTION

An innovative all-optical flat-panel display system is based on the generation of photoluminescence within a doped, optical waveguide, display matrix. Color photoluminescence is produced through a simple infrared, two-step, photonic upconversion process and the subsequent radiative emission process. Full-color photoluminescence is provided in the guided-wave system. Solid-state laser design and electronic upconversion are used in a host glass substrate. Integrated optics and photolithographic fabrication techniques for dielectric waveguides and erbium-doped fiber amplifier design are used in the display. Guided-wave photoluminescent display systems provide a new generation of emissive, flat-panel information display systems that are thinner, lighter weight, more power efficient, and more cost competitive to produce than the existing technologies. High readability in varying lighting conditions, viewing angle independence and size scalability are delivered without brightness and color quality sacrifice. Rugged solid-state construction provides vibration and thermal insensitivity. The present invention is size-independent. Cost-effective production of flat-panels provides for sizes beyond 13 inch diagonals. The invention is useful in military, personal computing, and digital HDTV systems, multi-media, medical, and broadband imaging displays, and large-screen display systems.

The new display system employs the physical phenomena of photoluminescence in a flat-panel display system.

The present flat-panel information display technology supports a range of defense and commercial information display system applications. Attributes of the present technology include:

light weight construction.

thin display dimensions.

full-color operation at video rates.

efficient power utilization.

scalability from small portable and mobile devices to large HDTV display areas.

solid-state, rugged construction.

simple manufacturing processes.

The flat-panel display is an unique all-optical approach. The underlying physical principle upon which this display is based is the phenomenon of photoluminescence. Photoluminescence is induced in the display system by the excitation of rare earth and transition metal ions. This display system is called an all-optical, photoluminescent display.

BRIEF DESCRIPTION OF THE DRAWINGS

FIG. 21 is a schematic front elevation of a resonant cavity structure/couple power cavities with gray-scale or luminescence control.

FIG. 22 schematically shows a proximity waveguide pixel.

FIG. 23 is a schematic bottom view of a pixel cavity and waveguides.

FIG. 24 shows photon distribution.

FIG. 25 schematically shows gray-scale control in adjacent pixel cavities.

FIG. 26 is a schematic bottom view of the structure shown in FIG. 25.

FIG. 27 is a schematic front view of a pixel cavity and waveguides.

FIG. 28 is a bottom view of the pixel cavity and waveguides shown in FIG. 27.

FIG. 29 is a schematic representation of a pixel cavity and individual color waveguides.

FIG. 35 is a table showing the power requirements, pixel parameters, display physical attributes, laser driver attributes and display system efficiency for a preferred 21 inch display embodiment of the present invention.

FIG. 36 a table showing the power requirements, pixel parameters, display physical attributes, laser driver attributes and display system efficiency for a one inch display embodiment of the present invention.

FIG. 37 shows a coupled cavity, pixel cell embodiment of the present system.

DETAILED DESCRIPTION OF THE PREFERRED EMBODIMENTS

Figure 1A:
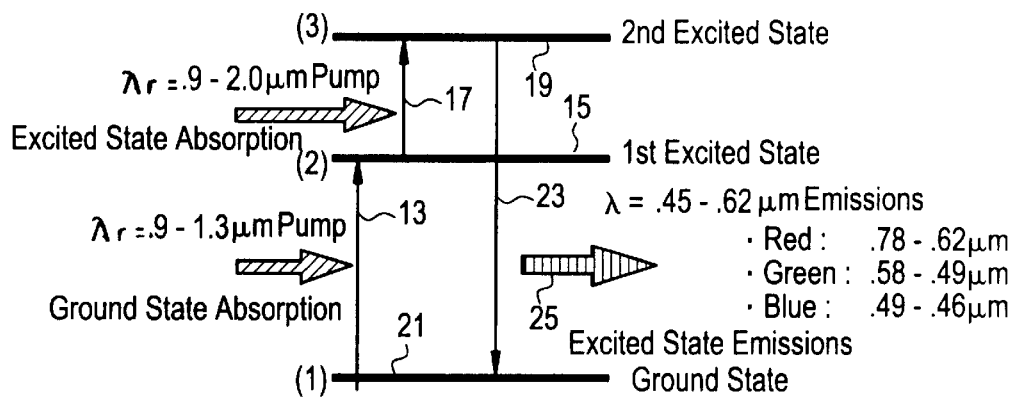
FIGS. 1A and 1B are schematic representations of flat-panel photoluminescent excitation process and architecture concept.
Figure 1B:
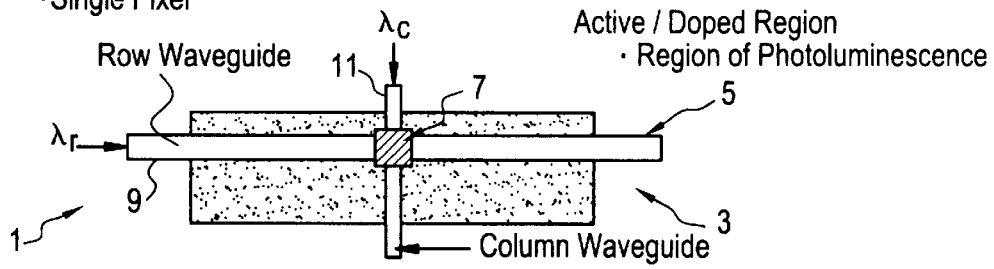

Operation of the all-optical, flat-panel, photoluminescent display system is illustrated in FIGS. 1A and 1B.

FIGS. 1A and 1B are schematic representations of flat-panel photoluminescent excitation process and architecture concept.

The display device 1 has a matrix 3 of intersecting optical or dielectric waveguides 5. Each 4-port, row-column waveguide intersection 7 is doped with a photo-active or photoluminescent material. Each intersection corresponds to a display pixel and is referred to in FIG. 1B as the active region. The display operates by photonic excitation of the active region 7 into a state of luminescence. The excitation process is a coordinated row-column, laser-based, optical pumping strategy called optical addressing. Optical addressing is conceptually illustrated in FIG. 1B.

Optical addressing is defined as a method for controlling an array of photoluminescent picture elements or pixels. A photoluminescent pixel is defined as the spatial junction or intersection of a row 9 and a column 11 optical waveguide. A pixel is excited into a photoluminescent state through the absorption of photonic power at the row-column intersection 7 of the waveguides 9 and 11. The photoluminescent pixel is the basic building block of the photoluminescent display.

Optical addressing employs the row and column optical waveguides to deliver photonic power to the selected picture element. The photonic power source that supplies the waveguide is a semiconductor laser, light-emitting diode, or miniature solid state laser. Photonic power is provided at infra-red wavelengths. For efficient upconversion, lasers are the preferred power source.

Display or pixel luminescence is induced through a two-step optical pumping process illustrated in FIG. 1A. The first excitation 13 is provided by a row laser which excites the row waveguide pixel into a non-radiative, intermediate metastable state 15. The second excitation 17 is provided by a column laser. The column optical wave then excites the pixel (luminescence center) into a visible photoluminescent state 19. The row excitation 13 process creates in the display matrix a localized, electronic population inversion at the pixel site. The column excitation 17 process determines the color and other fluorescent properties. The effect of the row pump is to select the desired set of pixels. The effect of the column pump is to select pixel color, intensity, hue, gray-scale, and other luminance properties.

A major advantage of photoluminescent display systems is architecture simplicity. Advantages of this architecture include:

No wiring and electrodes: No anode. No cathode.

No drive voltages or electric currents.

No threshold or saturation voltages.

No thin film transistors or active devices.

No optical and polarization elements.

Total solid state construction: No ionized gases. No liquid crystal materials.

Three elements provide a photoluminescent display device. Those elements are:

Addressing Method. Addressability is provided by an optical waveguide matrix of N rows and M columns which confine and guide power to the selected pixel location.

Power Source. Power is provided to the optical waveguide matrix by a collection of (N+M), independently selected, infra-red photonic power sources which control the excitation of the display matrix pixels.

Photo-active Material. Each optical waveguide matrix junction is doped with a material that will respond to the infra-red power, control signals to emit visible, luminous power.

The display is a photonic device. It has the advantage that it will operate at a single voltage level. Three matrix architectures are:

Guided-Wave Photoluminescent Display (GWPLD).

Active Matrix Photoluminescent Display (AMPLD).

Guided Row, Active Column Photoluminescent Display (GRACPLD).

A brief description of each follows.

Guided-Wave Photoluminescent Display

The GWPLD system is an all-optical waveguide, display matrix structure. The display matrix consists entirely of intersecting row and column waveguides. Theoretically, the matrix can be extended to an arbitrary number of rows and columns. This system employs the optical addressing technique to induce luminescence at each pixel as described above. Manufacturing of this structure employs simple photolithographic techniques and consequently enjoys excellent economics and manufacturing yields.

Active Matrix Photoluminescent Display

This structure offers a great degree of pixel control and flexibility. Active elements are positioned at each pixel, resulting in pixel-by-pixel and color imaging control. Each pixel is activated by selecting both the corresponding row and column.

Guided Row, Active Column Photoluminescent Display

This matrix structure combines the two prior structures. Each row is optically addressed as in the GWPLD system. However, the columns are electrically addressed pixel-by-pixel as with AMPLD.

In each case the waveguiding structures and active regions are fabricated employing simple, photolithographic technology. The simple device architecture results in a reduction in manufacturing complexity and increased manufacturing yields.

The photoluminescent display system functions by converting infra-red power to emitted, visible light. Color generation or photoluminescence is produced through a simple infrared, two-step, photonic upconversion process and the subsequent radiative emission process. Four areas provide the technical foundation of photoluminescent display devices. These areas are:

Photoluminescence.

Doped-Fiber Amplification and Laser Operation.

Host Glass and Active Material Phenomena.

Optical Waveguide Theory.

A overview of the relevant concepts is provided in the following sections.

Luminescence is the general phenomenon involving the emission of radiation from a solid when supplied with some form of energy. Photoluminescence is excitation arising from the absorption of photons.

Absorption involves the excitation of an electron from its lowest energy state to a higher energy state by radiation. Fluorescence is produced by the return of the excited electron to a lower state with the emission of the energy difference between the two states as radiation. Fluorescence is a special case of luminescence when light is emitted almost simultaneously with the introduction of the excitation energy and ceases within $10^{-9}$ to $10^{-5}$ seconds after the exciting radiation ceases. Phosphorescence is the phenomenon in which the light emitted persists for a greater period of time after excitation is removed. Photoluminescence is the process by which energy is transferred to the crystal or host by the absorption of a photon.

Independent of the form of excitation, the wavelength of the emitted radiation between the energy level $E_2$ and $E_1$ is given by:

$$\frac{hc}{\Lambda} = E_2 - E_1. \qquad (1)$$

The display system employs a two-step excitation process to create photoluminescence. The basic process is illustrated in the energy level diagram of FIG. 1A. The three states of this process are:

Ground State Absorption—Level 1 to Level 2 Excitation: Level 1 to Level 2 excitation 13 is accomplished through the electronic absorption of the primary bombarding photons which excite the electrons from the ground level state to the first excited state 15. This state is metastable. A metastable state is an excited electronic state with a lifetime lasting a long period compared to the excitation time.

Excited State Absorption—Level 2 to Level 3 Excitation: Level 2 to Level 3 excitation occurs when a secondary beam of photons transfers 17 the excited state electrons into an even higher energy state 19. This process is called upconversion. The higher state corresponds to an energy level that is in the visible region relative to the ground state 21. The level 19 is not metastable and electrons excited into this state will decay 23 within nanoseconds to the ground state. The combination of the primary and secondary excitation processes will result in a level 3 energy 25 corresponding to one of the primary colors: red, green, or blue of the optical spectrum. Equation 2 defines the relationship between the two excitation wavelengths and the emission wavelength.

Spontaneous Emissions—Level 3 to Level 1 Emission: The final step occurs automatically. The excited electron fluoresces by decaying spontaneously to the ground state producing localized fluorescence at that point, or pixel. The color and intensity of this transition is controlled by the secondary pumping process. The specifics of the display matrix design determine whether this emission is either monochromic or full-color.

The purpose of the primary pumping process is to create a localized excitation of the electronic population. The intensity or brightness of the emitted signal depends on the number of electrons pumped into level 3, which is a function of the power provided in the secondary beam. Brightness and color control are provided by the secondary beam.

When two excitation beams having the respective wavelengths $\lambda_{12}$ and $\lambda_{23}$ combine at a display matrix intersection, a localized fluorescence or pixel is produced at that point. The fluorescent wavelength of the emissions is:

$$\frac{1}{\lambda_{31}} = \frac{1}{\lambda_{12}} + \frac{1}{\lambda_{23}} \Leftrightarrow \lambda_{31} = \frac{\lambda_{12}\lambda_{23}}{\lambda_{12} + \lambda_{23}} \quad (2)$$

Pixel output power is controlled by the physical parameters as indicated in Equation 3. Assuming a nonsaturating pump is employed the output power at any single pixel is:

$$F_{31} = n\tau\eta_{31}B_{12}I_{12}B_{23}I_{23} \text{ photons/(cm}^3 \cdot \text{second)} \quad (3)$$

n: Density of active centers per cm$^3$.

τ: Pump Duration in seconds.

$\eta_{31}$: Probability that once a center is excited to level 3 it will decay radiatively by emitting a photon of wavelength $\lambda_{31}$.

$B_{12}$: Absorption cross sections in cm$^2$.

$I_{12}$: Average pump power densities in photons/(cm$^2 \cdot$ second).

$Pj_{23}$: Absorption cross sections in cm$^2$.

$I_{23}$: Average pump power densities in photons/(cm$^2 \cdot$ second).

Figure 2:
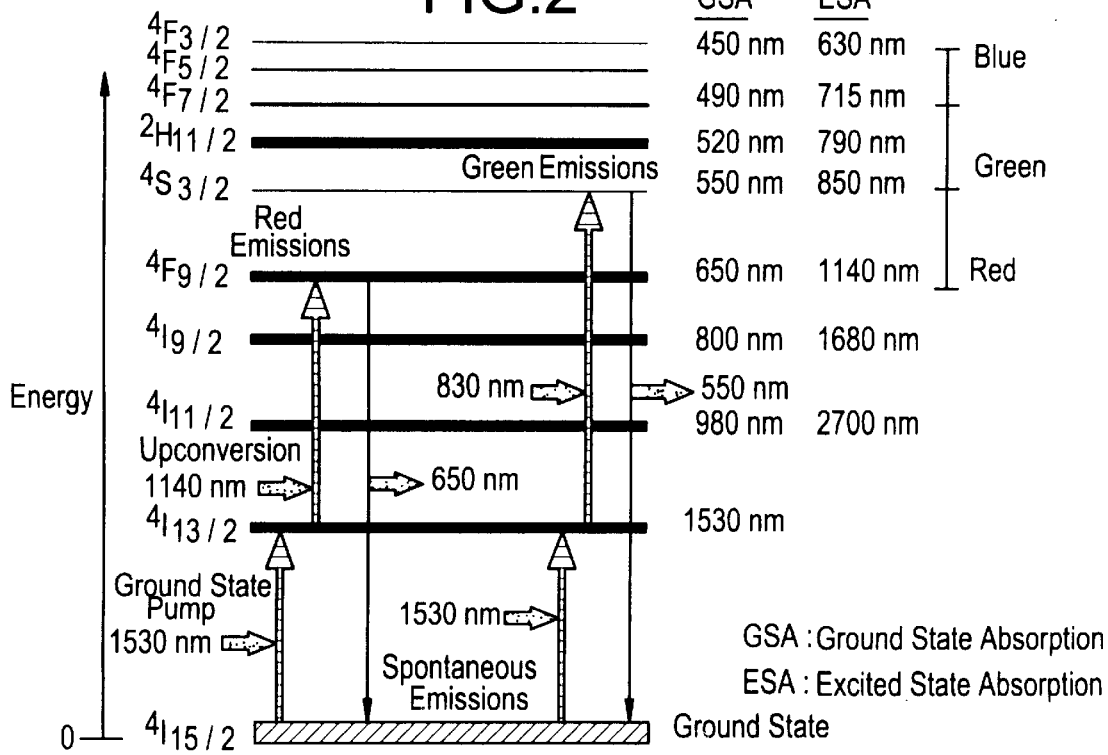
FIG. 2 schematically shows red and green photoluminescence in $CaF_2$ doped with $Er^{3+}$.

Equation 3 shows that display operation uses materials that offer sufficient cross sectional efficiency to provide the desired characteristics of fluorescence. The process has been demonstrated in several transparent fluoride crystals and glasses doped with a variety of rare-earth ions. In particular, the energy level diagram for $CaF_2$ doped with $Er^{3+}$, is shown in FIG. 2. In this configuration, infrared upconversion of the $Er^{3+}$ ion can be caused to emit two different colors: red (650 nm) and green (550 nm). Localized fluorescence of both colors has been observed. The emission of the system is spontaneous and isotropic.

FIG. 2 schematically shows red and green photoluminescence in $CaF_2$ doped with $Er^{3+}$.

Semiconductor lasers and diodes can be readily fabricated at infrared wavelengths to support the required ground state and upconversion pump energies.

An output intensity of $10^{-7}$ W/1-mm$^3$ pixel is obtained. This corresponds to a luminous flux emitted by a single CRT pixel and is equivalent to a spot radiant intensity of $5.2 \times 10^{-6}$ lm/sr. Brightness can be increased several orders of magnitude by increasing the pump powers or choosing more efficient doping compounds, permitting support of display systems ranging from helmet-mounted to large screen display systems, operating in lighting conditions varying from sunlight to night time.

Figure 3:
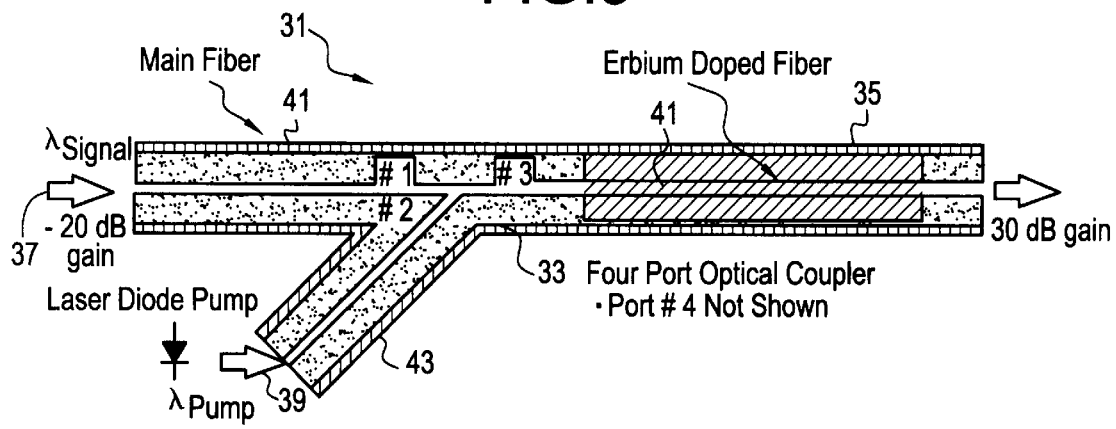
FIG. 3 is a schematic representation of a fiber amplifier doped with $Er^{3+}$.
Figure 4:
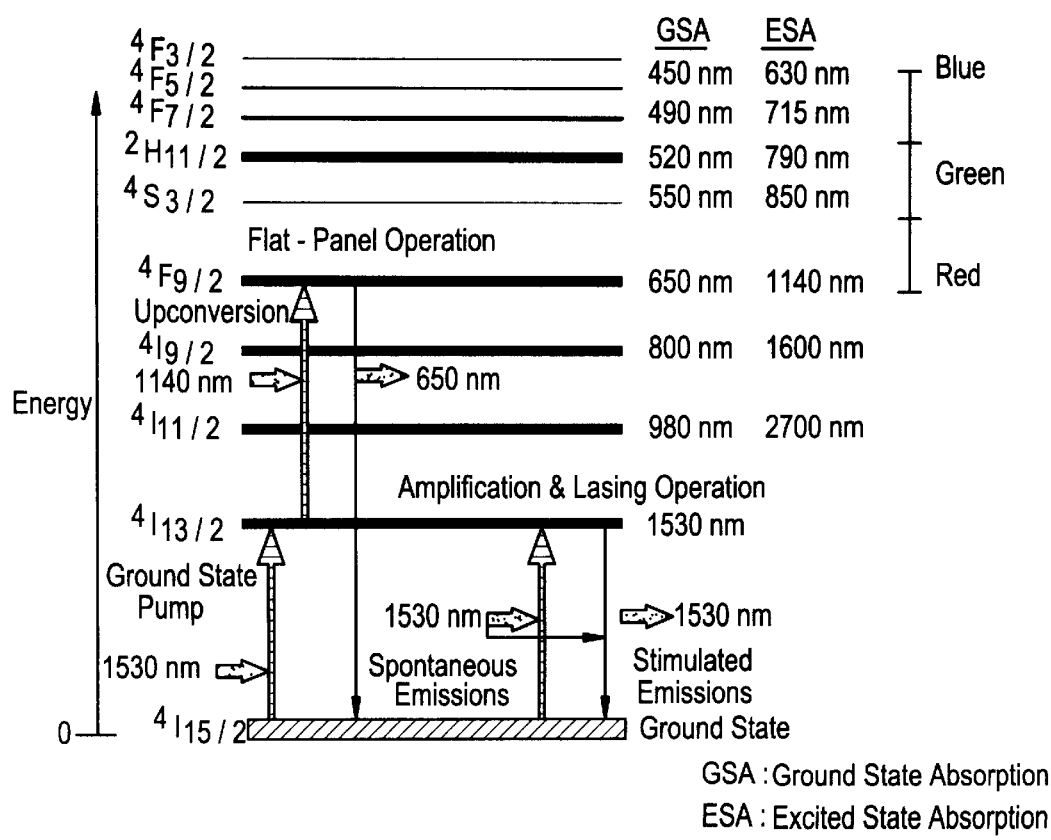
FIG. 4 is a schematic comparison of photoluminescence of $Er^{3+}$ flat-panel and lasing processes.

The basic principles of photoluminescent display technology are similar to doped-fiber amplification. A schematic diagram of an erbium doped fiber amplifier is illustrated in FIG. 3. The energy level diagram and photoluminescent process employing ionized erbium, $Er^{3+}$, are illustrated in FIG. 4. FIG. 4 contrasts the flat-panel display and lasing processes.

Illustrated in FIG. 3 is the amplifier architecture. The amplifier 31 has several parts. A dichroic coupler 33, a 2-by-2 device, couples into the doped-fiber section 35 the energy of both the signal wavelength 37 and the pumped wavelength 39. To obtain maximum luminance from the fiber it is not necessary to dope the entire fiber. Sufficient power luminance can be obtained from a doped material region 41 concentrated at the fiber core of several microns in diameter. That is important in designing the doping profile for the display.

FIG. 3 is a schematic representation of a fiber amplifier doped with $Er^{3+}$ Emissions in the doped-fiber amplifier 31 are induced through the process of stimulated emission, which downconverts the excited metastable electrons to the ground state.

Emissions in the photoluminescent display are induced when the excited metastable electrons are upconverted to a higher energy state, from which they then spontaneously decay.

The two processes are compared in FIG. 4.

Several advantages of this device architecture are:
(1) Laser diode pumping provides the most efficient mechanism for obtaining the target population excitation and upconversion.
(2) Fabricating integrated optoelectronic devices such as the optical waveguide is a simple photolithographic process.
(3) Since the fluorescence process is controlled by discrete atomic lines rather than continuous energy bands, as in active semiconductor lasers and amplifiers, the display device has a much lower sensitivity to temperature and environmental variations.

FIG. 4 is a schematic comparison of photoluminescence of $Er^{3+}$ flat-panel and lasing processes.

The display can be constructed on either a glass or polymer based substrate material. A number of glass and polymer substrate materials are either commercially available or readily fabricated for this application. Such glass materials include: germanium oxide, zirconium fluoride, barium fluoride, strontium fluoride, lithium fluoride, and yttrium aluminum garnet glasses. This list is not intended to be all inclusive of the materials that may be employed for this application.

Two important advantages are provided by host glass material selection:
(1) Control of Fluorescent Properties. Both the radiative and non-radiative properties of dopant ions are controllable functions of the host material. Therefore fluorescent characteristics such as excited state lifetime, emission lineshape, and absorption cross sections are all controllable by the choice of host material.
(2) Simple Fabrication. Simplification of the production process can be accomplished by employing materials which can easily support the photolithographic fabrication of optical waveguiding structures.

Using standard photolithographic pattern definition and reactive ion etching the optical waveguide display matrix can be directly formed onto a single glass substrate. Glass makes an ideal host for this application because it can be cast into a variety shapes and forms. It can be coated onto a variety of materials and is stable under a wide range of environmental conditions. Glass is optically isotropic, easy to fabricate, possesses excellent optical quality, and durability. It can be more heavily and homogeneously doped than crystal. Increased doping concentration, in general, will lead to absorption and emission band broadening and shorter florescence decay time. The importance to display system design of those attributes are:

Energy band broadening is ideal for generating a broadband, white emissions spectrum.

Excited state lifetimes and decay time control pixel refresh rate requirements.

Since the host is doped with rare earth and/or transition metal materials it is essential that the dopant be highly soluble in the glass or polymer based host.

The host will also impact the performance and color behavior of the device. The host phonon energy, normal modes, or wavenumber affect the transition between adjacent quantum states of the excited luminescence center ions. A low phonon wavenumber causes the luminance properties to be largely determined by the ion and ion concentration. A larger phonon wavenumber host leads to spectral broadening and potentially higher-quality white-light generation. However, the low wavenumber host is the desirable property of operating over a broad temperature range without appreciable change in display performance.

Specific glass types include silica glasses, heavy metal Fluoride glasses, oxide glasses and phosphate glasses.

A principal component of the photoluminescent flat-panel display system is the optical waveguide, also known as a dielectric waveguide. Two key functions are provided by the waveguides. They confine and guide the row and column optical wave to the intersection of the display matrix, called the pixel. The waveguides provide efficient optical upconversion by creating a high optical power density concentration in the waveguide.

The coupling of the row and column waves at an intersection, which corresponds to the photo-active region of the guide, excites the local electrons into photoluminescence.

Figure 5A:
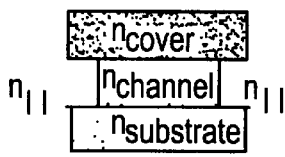
FIGS. 5A, 5B and 5C show schematic representations of channel waveguide structures.
Figure 5B:
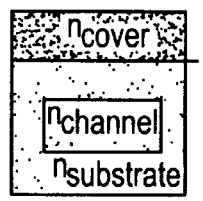
Figure 5C:
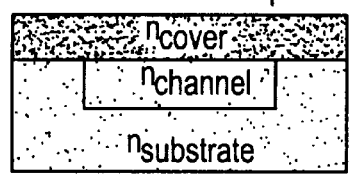

Several channel waveguide structures are illustrated in FIGS. 5A, 5B and 5C. The optical wave must be restricted to TM and TE propagation modes. TM and TE mode means that optical field orientation is perpendicular to the direction of propagation. Dielectric waveguides confining the optical signal in this manner are called channel waveguides. The buried channel and embedded strip guides are applicable to the proposed display technology. Research will determine which of the glass technologies listed can best support fabrication of these device structures.

FIGS. 5A, 5B and 5C show schematic representations of channel waveguide structures.

As with metallic or microwave waveguides, the electromagnetic behavior is governed by Maxwell's equations. Dielectric waveguides exhibit analogous behavior in terms of their modal field properties including: orthogonality, symmetry, power transport, energy storage, and the variation properties of the modes.

The guides can be operated either single or multi mode. Typical waveguide geometries are as follows.

(1) Multimode Step-Index:
   Core diameter: 50–400 micrometers
   Cladding diameter: 125–500 micrometers
(2) Singlemode Step-Index Fiber:
   Core diameter: 3–10 micrometers
   Cladding diameter: 50–125 micrometers Each intersection forms a four-port waveguide junction. Power propagates into the desired port or is scattered out the undesired ports during row addressing. Efficient luminescence requires that the row optical power be delivered only to the row ports of each junction. Column addressing and excitation should occur only at the excited row. With ideal row power delivery the situation creates a total absorption of the column wave. As the column wave propagates the matrix the unexcited rows will appear transparent to the beam.

Key points in the waveguide display matrix are:

(1) Row waveguide spatial geometries are selected to propagate a row wavelength ($\lambda_r$) which is greater than the column wavelength ($\lambda_c$).

(2) Column waveguide spatial geometries are selected to propagate a column wavelength ($\lambda_c$) which is less than the row wavelength ($\lambda_r$).

(3) Column waveguide spatial geometries are selected to reject the propagation of the row wavelength ($\lambda_r$).

(4) A converse row-column waveguide design strategy could be employed.

(5) The intersection of a row-column waveguide pair is orthogonal.

The waveguide controlled addressing system is a true digital design approach. Key benefits on the waveguide display matrix design are:

(1) There is no need for an optical focusing lens system.

(2) There is no need for an optical scanning apparatus or system.

Figure 6A:
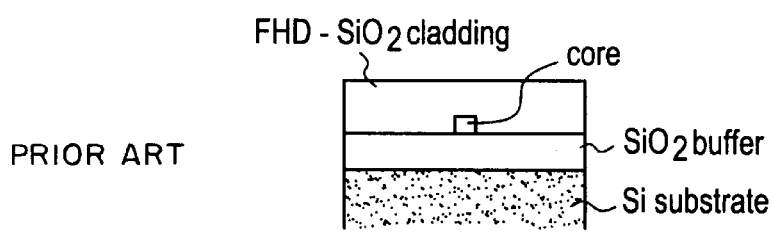
FIGS. 6A, 6B and 6C are schematic representations of alternative waveguide channel structures.
Figure 6B:
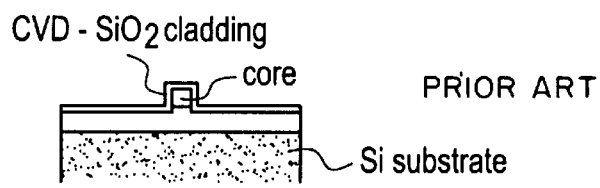
Figure 6C:
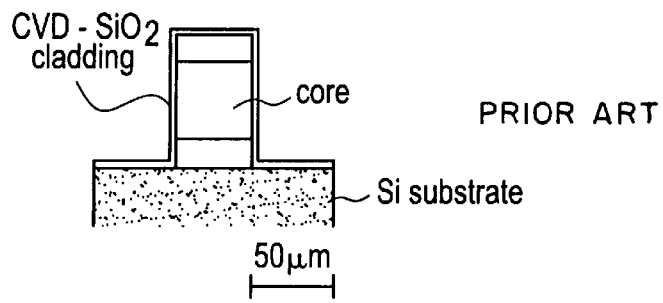

FIGS. 6A, 6B and 6C show variations of silica waveguide structures on a silicon (Si) substrate. FIG. 6A shows a single mode buried waveguide. FIG. 6B shows a single mode ridge waveguide. FIG. 6C shows a multimode ridge waveguide. Abbreviations are as follows: Flame Hydrolysis Deposition (FHD) and Chemical Vapor Deposition (CVD).

FIGS. 6A, 6B and 6C are schematic representations of alternative waveguide channel structures.

Several display matrix structures are listed below. The function of each structure is presented in the following sections.

Guided-Wave Photoluminescent Display (GWPLD).
Active Matrix Photoluminescent Display (AMPLD).
Guided Row, Active Column Photoluminescent Display (GRACPLD).

The guided-wave photoluminescent display provides a new type of digital display system that generates various colors within the visible spectrum in response to a two-step, infra-red, photonic upconversion process.

The guided-wave photoluminescent display is implemented in the form of an optical, waveguide matrix device. The display device includes:

(1) An array of intersecting, perpendicular optical waveguides (2) A collection of N semiconductor laser diodes to drive, excite, or select the row waveguides.

(3) A collection of M semiconductor laser diodes to drive, excite, or select the column waveguides.

(4) Regions of photo-active materials to respond to the pump radiation of the row and column lasers.

Figure 7:
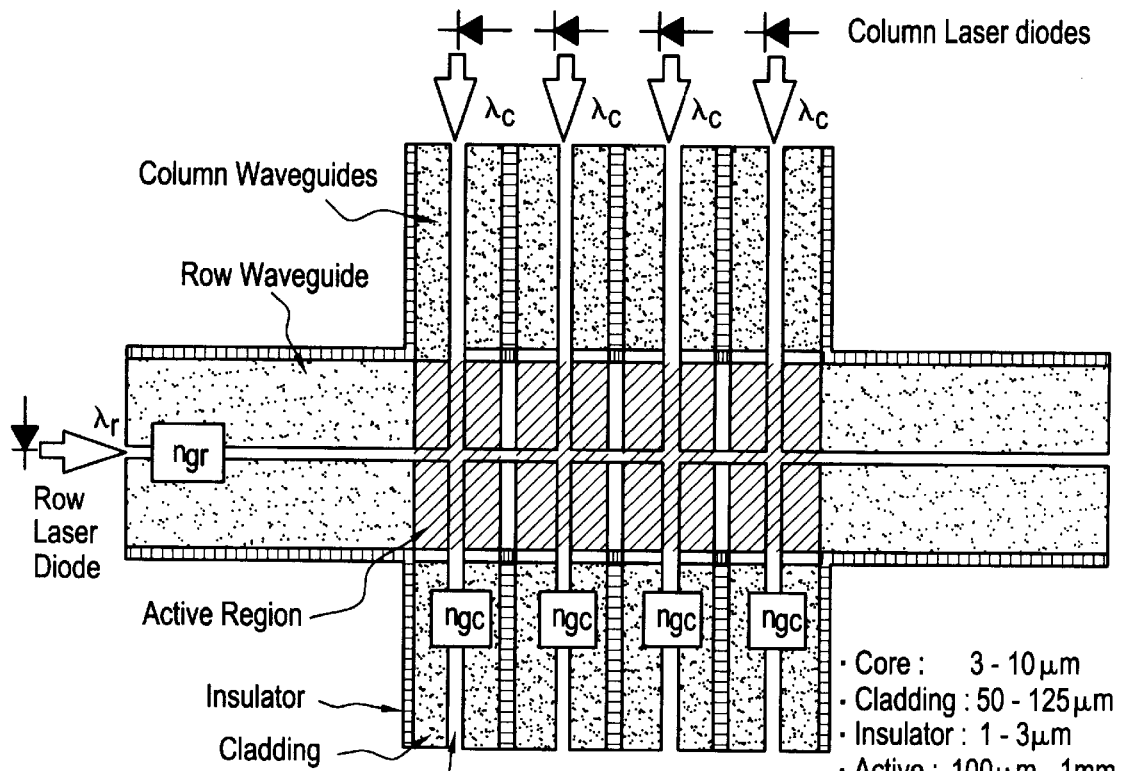
FIG. 7 is a schematic diagram of a top view of a 1×4 guided-wave photoluminescent display.

FIG. 7 is a schematic diagram of a top view of an 1×4 guided-wave photoluminescent display.

FIG. 7 illustrates an array of 4-port junctions forming a 1×4 display. In this figure four column laser diodes and a single row laser diode are shown. Four distinct active regions are illustrated. As illustrated, row and column waveguides are of different geometric dimensions to minimize row-to-column power coupling.

Figure 8:
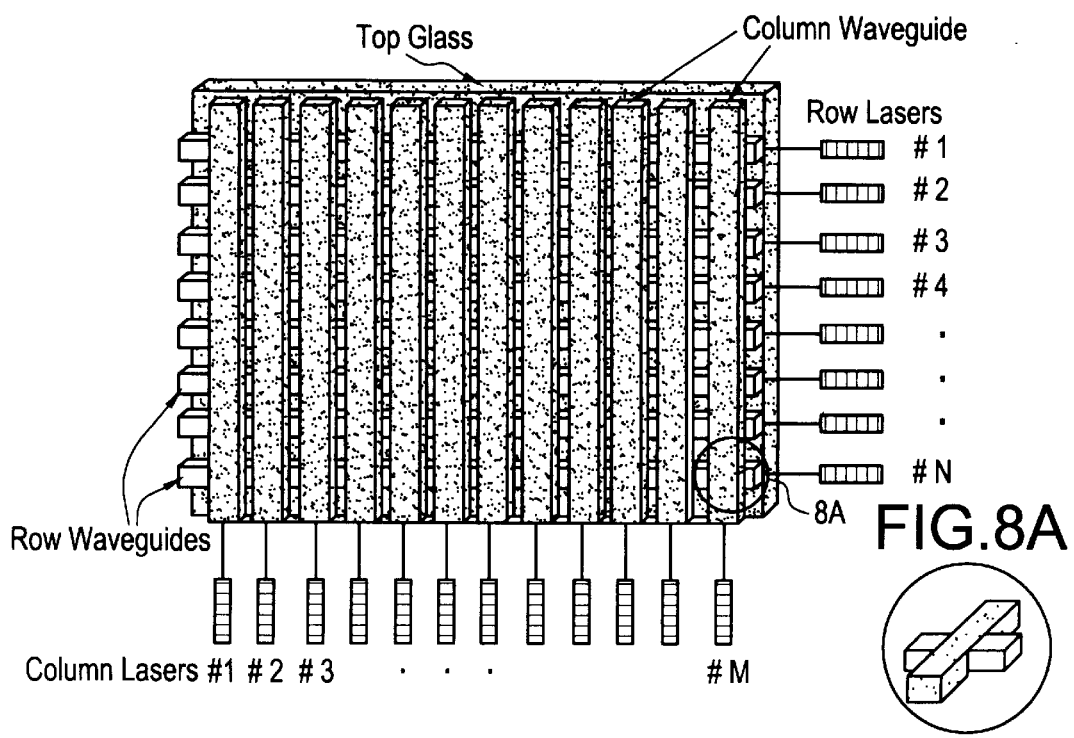
FIG. 8 is a schematic diagram of a perspective view of a N×M guided-wave photoluminescent display.

FIG. 8 is a schematic diagram of a perspective view of a N×M guided-wave photoluminescent display.

The guided-wave photoluminescent display matrix is a two-step, infra-red upconversion device.

Step one is a ground to metastable state conversion. It is provided by a selected row laser.

Step two is a metastable to localized fluorescent state conversion. It is provided by a selected column laser.

The device is constructed of a host material which is transparent to visible light. The intersection of each waveguide junction corresponds to a display pixel. For color generation the waveguides are doped with one or more rare earth and/or transition metal ions. Each pixel is selectively activated by the row-column optical addressing illustrated in FIGS. 1A and 1B. The pump row and column wavelengths are in the infrared region and the emitted light is in the visible region of the desired color. The color of the pixel is determined by the choice of incident radiation and the dopant materials and their concentrations. Dopant concentrations range from one to ten mole percent.

Each waveguide consists of a cladding and combination core and active layer. These layers are fabricated in either a glass-based or polymer-based substrate. The core has a refractive index greater than the cladding layer. The core guides the optical power to the matrix junction. At the intersection of the waveguide the interacting optical beams force the active layer materials into a luminescent state. The active layer includes a combination of dopants that cause it to respond to the optical addressing by emitting visible radiation.

The active layer operates through spontaneous emission. Active layer dopant or dopants include of rare earth and transition metal ions either singly or in combinations. The excitation of rare earth and transition metal ions in glasses has been used to make lasers and other fluorescent systems. The active layer, consisting of the dopant, is about 3–5 micrometers thick to induce single-mode propagation. The active region is thin enough to achieve high pump power densities. High power density operation assures efficient excitation of the active ions. Dopants may be placed in the cladding layer. Thermal insensitivity of host substrate and dopant materials permit device operations over a broad temperature range. The device is fabricated using conventional microelectronic techniques.

FIG. 7 shows a top-down view of an all-optical guided-wave photoluminescent display in a 1-by-4 pixel configuration. The configuration contains a single row pumped with a wavelength $\lambda_r$. Assuming monochromatic operation, the column is pumped with wavelength $\lambda_c$. The different dielectric properties of the row and column waveguides are indicated by the waveguide indices $n_{gr}$ and $n_{gc}$ respectively. As illustrated, the row and column waveguides may be designed with different dimensions to control the allowed propagation modes and cut-off wavelengths.

The potential for visible fluorescence from an erbium doped fluoride-glass is shown in the energy diagram of FIG. 2. An erbium doped device functions as follows:

(1) Applying a 1530 nm saturating row pump beam ($\lambda_r$) selects the pixel.
(2) Applying an upconversion column pump beam ($\lambda_c$) at 1140 nm, 790 nm and 630 nm generates respectively, blue, green, and red fluorescence occurring at 450 nm, 550 nm and 650 nm.

An important attribute of the selected pump wavelengths is that $\lambda_r$ is a longer wavelength than either of the $\lambda_c$ wavelengths. This choice of frequencies inhibits the coupling of row and column waveguide signals.

Energy levels of the $Er^{3+}$ ion are shown in FIG. 2. Erbium ions are directly excited to the $^4I_{11/2}$ energy level by the row pump beam. The column laser excites the inverted electronic population into the $^4F_{3/2}$ level. The decay of these ions to the $^4I_{15/2}$ level provides the source of the 450 nm emission. Respective conversions occur at red and green fluorescence.

A full-color display system is shown in FIG. 2.

(1) A row laser diode operates at 1500–1600 nm.
(2) A second laser diode providing a column pump operates at approximately 1140 nm producing a 650 nm upconverted red emission.
(3) A third laser diode provides a column pump operating at approximately 850 nm producing a 550 nm upconverted green emission.
(4) A second laser diode provides a column pump operating at approximately 715 nm producing a 490 nm upconverted blue emission.

A host material doped with a suitable concentration of $Yb^{3+}$—$Er^{3+}$ more efficiently upconverts the incident radiation into the 650 nm red and 550 nm green emissions. A $Yb^{3+}$—$Tm^{3+}$ doped host will more efficiently upconvert the incident radiation into the 470–490 nm blue emission. In each case ytterbium is a sensitizer ion that absorbs the row pump radiation more efficiently and then conveys this added energy to either the erbium or thulium through the column pump.

FIG. 8 is a schematic diagram of a perspective view of a N×M guided-wave photoluminescent display.

FIG. 8 shows a N×M perspective view of a system corresponding to the configuration of FIG. 7. The diagram illustrates how the optical pump is provided from a single entry-point of each waveguide.

Figure 9:
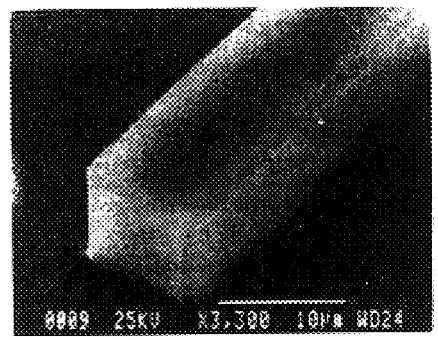
FIG. 9 is a perspective photomicrograph of a ridge channel waveguide.

FIG. 9 is a perspective photomicrograph of a ridge channel waveguide.

FIG. 9 shows a scanning electron microscope photograph of a single mode core ridge structure of the type that may be employed in a guided-wave photoluminescent display device.

Figure 10:
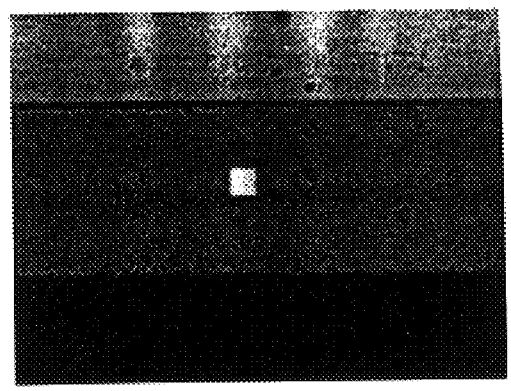
FIG. 10 is an end view of a buried channel waveguide.

FIG. 10 is an end view of a buried channel waveguide.

FIG. 10 shows a cross-sectional view of a single mode buried channel waveguide.

Figure 11:
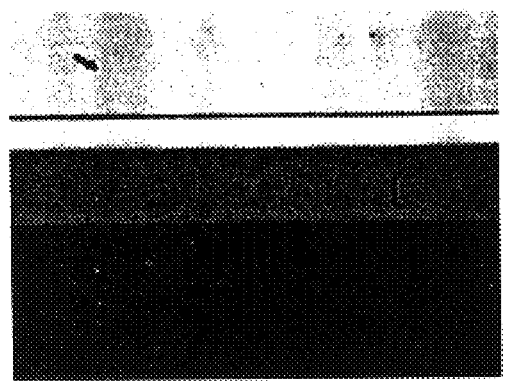
FIG. 11 is a side view of an embedded strip waveguide.

FIG. 11 is a side view of an embedded strip waveguide. FIG. 11 shows a planar waveguide of the type that could be employed by the guided row, active column display device to be described.

In contrast to competitive digital display technologies, the invention offers a significant reduction in basic complexity. Specifically, GWPLD requires N+3M versus the N×3M active elements required of AMLCD full-color systems. GWPLD technology is materials-driven versus process-driven technology for AMLCD. That results in production of highly cost effective devices.

The guided-wave photoluminescent architecture can be used to fabricate displays of large-area, direct-view HDTV dimensions currently not provided by any competitive FPD technology.

Figure 12:
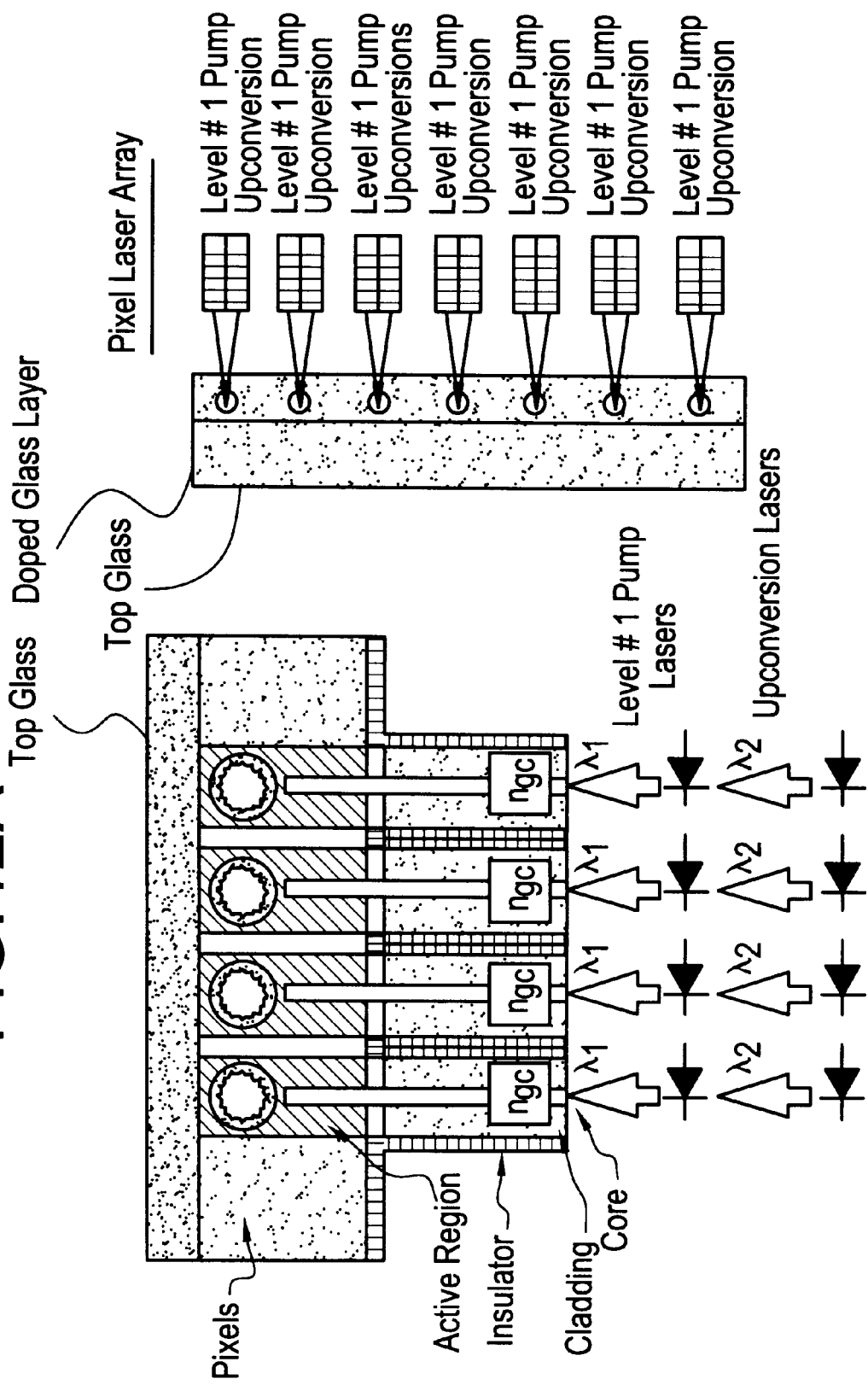
FIG. 12A is a schematic diagram of an active Matrix Photoluminescent Display.
FIG. 12B illustrates the similarities the existing CRT operations with multiple beams controlling the fluorescence process.

FIG. 12A is a schematic diagram of an Active Matrix Photoluminescent Display.

FIG. 12A shows a cross sectional view of the active matrix photoluminescent display (AMPLD) in a 1-by-4 pixel configuration. As shown, optical power is carried to the active region over the same waveguide. Each pixel is concurrently pumped with a wavelength $\lambda_r$ and $\lambda_c$ over the same optical channel. Both optical waves travel independently down the guide and are coupled by the photoluminescence process of the active region. This configuration permits a pixel-by-pixel control of fluorescence.

FIG. 12B illustrates the similarities to existing CRT operations with multiple beams controlling the fluorescence process.

Figure 13:
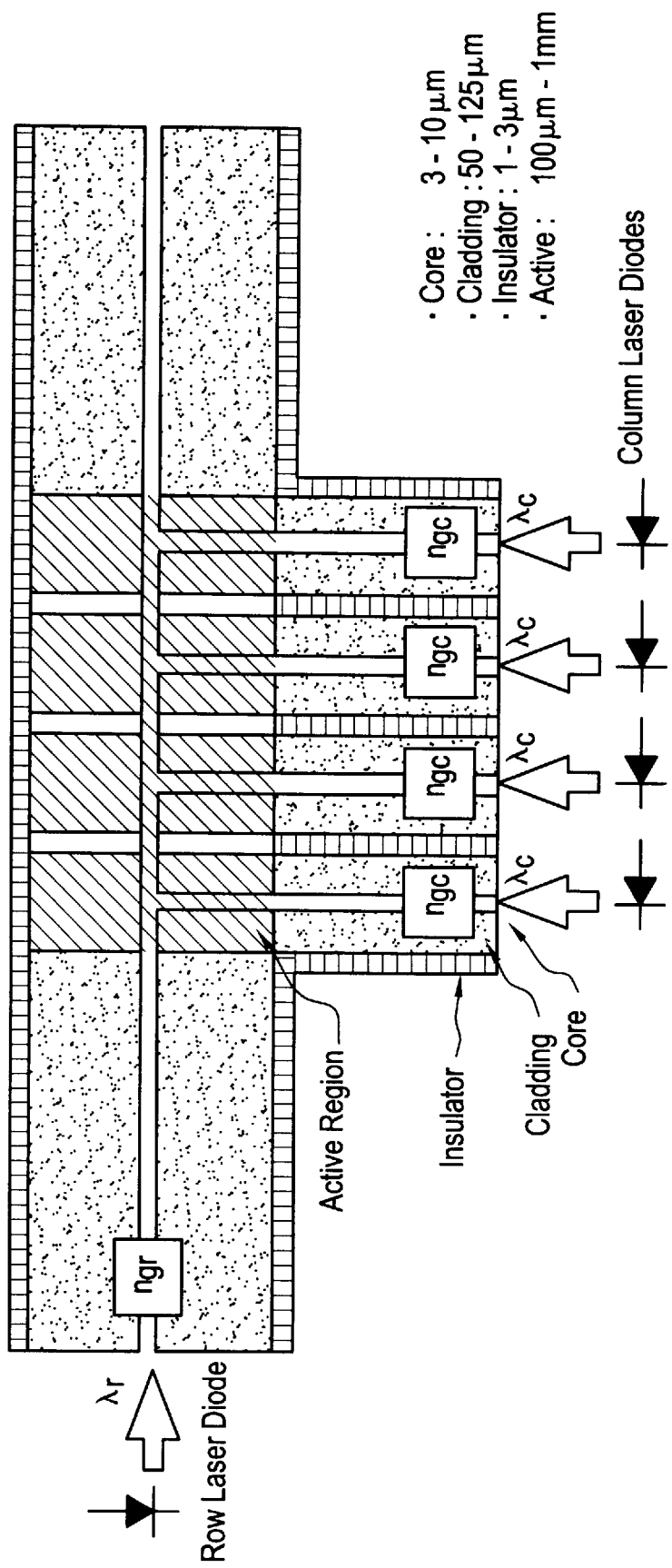
FIG. 13 is a schematic diagram of a cross-sectional view of 1×4 guided row, active column photoluminescent display.

FIG. 13 is a schematic diagram of a cross-sectional view of 1×4 guided row, active column photoluminescent display.

FIG. 13 shows a cross sectional view of the guided row, active column photoluminescent display (GRACPLD) in a 1-by-4 pixel configuration. The configuration contains a single row carrying a pumping wavelength $\lambda_r$. For monochromatic operation, each pixel is then pumped from a separate column laser of wavelength $\lambda_c$. Each row laser excites the selected row. Next, column lasers are activated on a pixel-by-pixel basis.

Rare earth and transition metal dopants may be incorporated into the active layer of the present invention either singly or in combinations. The selection of a particular dopant or dopants will primarily determine the emission spectra of a particular waveguide junction. Single rare earth dopants that can be used are erbium (Er), holmium, thulium, praseodymium, neodymium (Nd) and ytterbium. Some rare-earth co-dopant combinations include ytterbium:erbium, ytterbium:thulium and thulium:praseodymium. Single transition metal dopants are chromium (Cr), thallium (Tl), manganese (Mn), vanadium (V), iron (Fe), cobalt (Co) and nickel (Ni). Other transition metal co-dopant combinations include Cr:Nd and Cr:Er.

Transition metals can be introduced into the waveguide films either as the active ion or as a donor ion that transfers energy to a rare earth active ion. These dual operational properties arise from the presence of broad absorption and emission spectral structures of transition metals. Both have been exploited in bulk laser crystal pumped by flash lamps.

The listed materials are not intended to be exclusive of other materials that may be employed.

Numerous glass and polymer materials are available or can be fabricated for the device application. Known glass materials include: zirconium fluoride, barium fluoride, strontium fluoride, lithium fluoride, and yttrium aluminum garnet (YAG) glass. The listed materials are not intended to be exclusive of other materials that may be employed. The cladding and active layers have common or different materials. An overcladding layer may be formed to overlay the waveguide for performance purposes.

The device matrix is driven or excited by laser diodes at the waveguide inputs as shown in FIG. 6. The laser diodes of the optical driver circuitry may be monolithically integrated onto the glass or polymer substrate. Monolithic integration on the same substrate will yield a display system that is compact and inexpensive to manufacture.

The display matrix may be fabricated by ion exchange, flame and Vapor Deposition and thin film techniques.

The ion exchange method modifies the refractive index of the glass by replacing the alkali ion present in the glass host by other alkali ions. That is done by heating the substrate at a temperature high enough to allow the alkali ions to become mobile in the host structure. The choice of glass substrate and the replacement ion are important. The replacing ion must permit a change of index high enough to permit light guidance. The glass must be of optical quality, i.e., of high purity and homogeneous to avoid any source of scattering losses.

In flame and vapor deposition techniques films of glass are deposited onto a substrate. Film deposition techniques include flame hydrolysis, plasma-enhanced chemical vapor deposition, and sputtering techniques. After depositing a thin film, the optical circuit pattern is transferred from the mask onto the glass film, using lithographic and plasma-etching methods. An advantage is that the mask pattern sizes transferred are the same size as the waveguides. That one-to-one pattern transfer relaxes the dimensional tolerances on the mask significantly. Even with single-mode devices, feature sizes can be as large as 8 to 10 micrometers, which are well within the capability of lithography processes.

FIGS. 14A, 14B, 14C and 14D schematically show waveguide fabrication employing flame hydrolysis deposition.

Figure 14A:
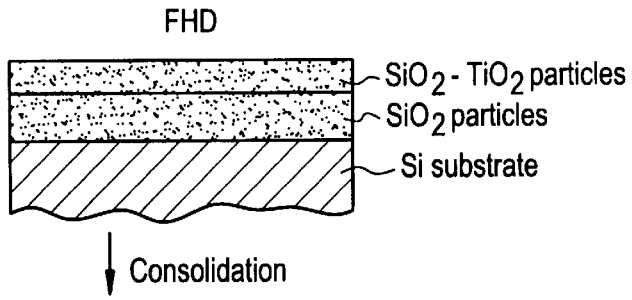
FIGS. 14A, 14B, 14C and 14D schematically show waveguide fabrication employing flame hydrolysis deposition.
Figure 14B:
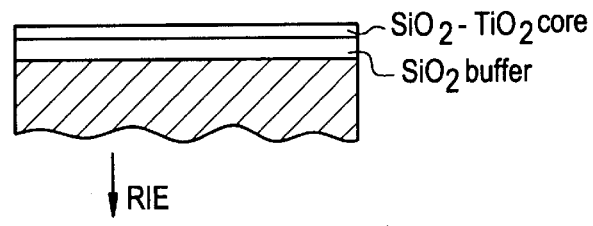
Figure 14C:
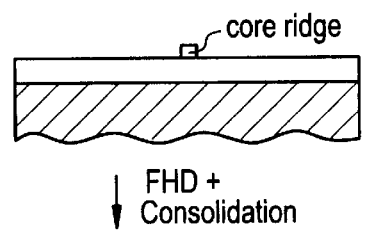
Figure 14D:
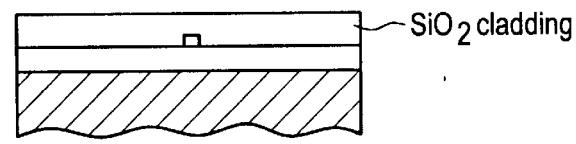

The fabrication process shown in FIGS. 14A, B, C and D for Si substrates involves the following steps:

Deposit two successive glass particle layers of buffer and core by flame hydrolysis (FHD).

Consolidate the glass layer in an electric furnace at 1200 to 1300 degrees centigrade.

Create waveguide structure by RF magnetron sputtering, photolithographic pattern definition, and reactive ion etching (RIE).

Cover the waveguide structures with a FHD—$SIO_2$ overcladding.

FIGS. 10 and 11 are examples of waveguides fabricated employing the method described. FIG. 9 illustrates a waveguide structure without the final over-cladding step.

Polymer waveguide materials offer the advantage of thin film fabrication and optical circuit patterning simplicity. However, attenuation characteristics and the thermal and environmental stability are generally not as good as glass films. Polymer technology, nevertheless, may provide the attractive economics needed for consumer-market application. Glass-based technology will provide the requisite consumer-market costs.

Photoluminescence is a basic principle of a flat-panel display device. Optical addressing uses a two-step optical upconversion or pixel addressing method. Guided-wave, dielectric, optical waveguide photonics are the fundamental electronic control structure of a flat-panel display device. Advanced and ultra-low loss glass materials are used as the substrate, host and waveguide material for a flat-panel display. Rare earth and transition metal material are used as a dopant of the host material, serving as the pixel or active compound excited by a two-step infrared upconversion process in an optical, guided-wave structure for a flat-panel display device. Large-area optical, guided-wave structures are provided. Semiconductor laser diodes are used as device drivers. Laser diodes create current-controlled luminescence operating at a single voltage level.

Figure 15A:
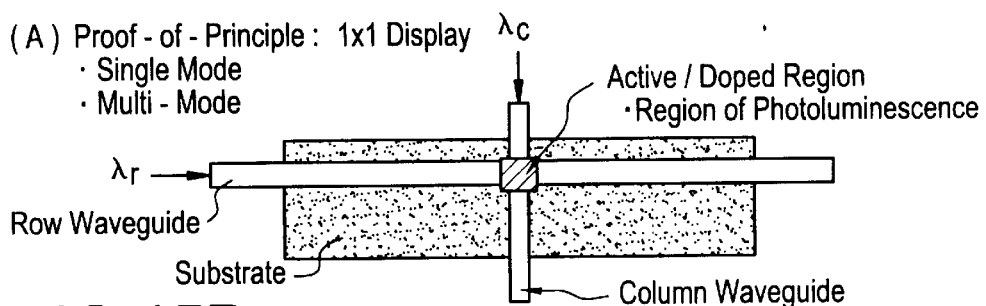
FIGS. 15A and 15B are schematic configurations.

Six preliminary display test configurations are illustrated in FIG. 15A and B. Each configuration in single and multi mode operation displays of single, white-light and full-color.

The isolated pixel configuration verifies the fundamental principle of guided-wave photoluminescence. The configuration is a 1×1 pixel array that allows the verification of the process of optical row-column addressing and verification of the two-step process for inducing fluorescence. The isolation configuration ensures that the basic principles hold and that no complex scattering effects from adjacent pixel or waveguide junctions affect the luminescence process. The configuration is operated in both single and multi mode operations.

Luminescence at the waveguide junction is measured for pixel shape and size; for pixel brightness, luminance, and intensity control, for pixel saturation and color control, and for power and photon absorption efficiency.

Waveguide behavior as defined by the port-to-port scattering coefficients be measured. The scattering matrix is expressed by the following.

$$S = \begin{pmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{pmatrix};$$

$S_{mn}$: scattering coefficients from port $m$-to-$n$.

The interacting pixel configuration verifies the more complex timing operations of multi-row and multi-column pixel selection. The effects of scattered power on neighboring pixel performance are examined. The goal of the 1 cm separation between waveguides is to ensure electromagnetic or optical isolation between neighboring junctions. That permits the examination of optical row and columns scanning and the determination of row-column pulse synchronization in both single mode and multimode waveguide structures.

Figure 15B:
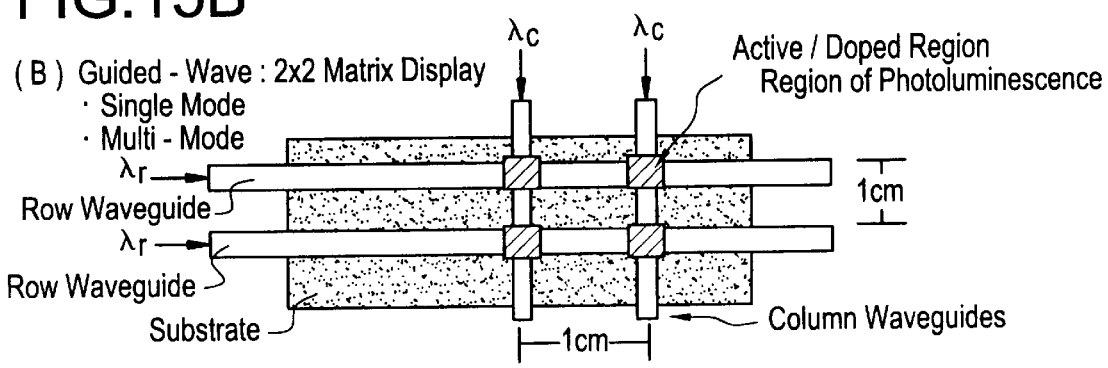

FIGS. 15A and 15B are schematic configurations.

Figure 16A:
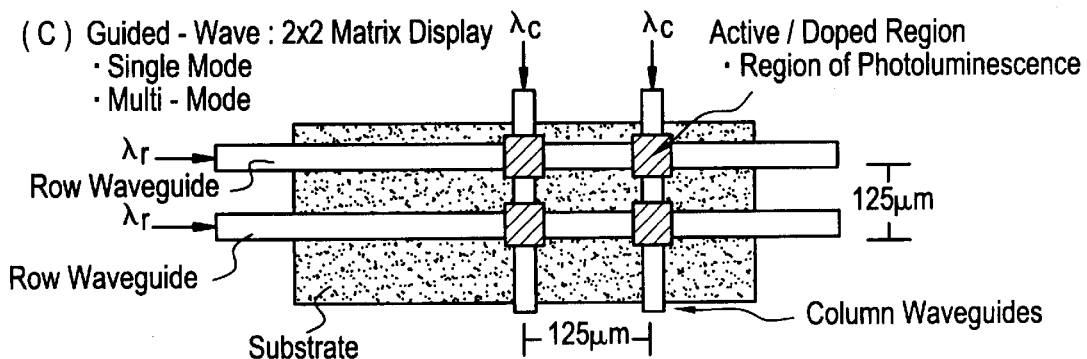
FIGS. 16A and 16B schematically represent configurations.
Figure 16B:
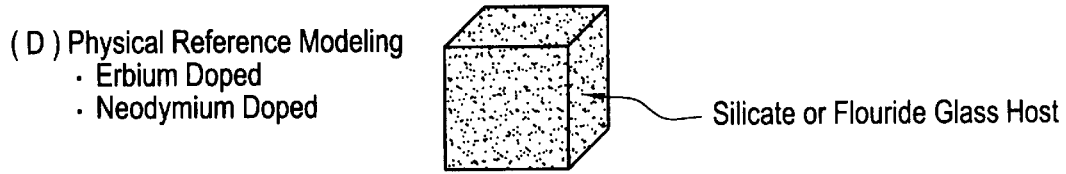

FIGS. 16A and 16B schematically represent configurations.

The interacting pixel configuration examines the effects of waveguide proximity. Adjacent waveguides are separated by 10–125 micrometers. Waveguides can be packed densely before power coupling between waveguides affects display operation. Power coupling between pixels is non-existent and consequently pixel behavior is independent of energy in adjacent waveguides. Scattered power may affect adjacent pixel performance.

Multi-row and multi-column pixel timing selection permit optical row and columns scanning, and determines row-column pulse synchronization and performance effects as pixel size is decreased using both single and multi mode waveguide structures.

The configuration shown in FIG. 16B determines the baseline performance and physical process behavior providing a reference model.

The configuration verifies the process of photoluminescence in a bulk glass host and determines experimentally the energy band structure and other spectroscopic characteristics of the doped glass material, including absorption spectrum and cross-sections, emission spectrum and cross-sections, excited state lifetimes, excited state radiative and non-radiative emission processes, upconversion processes and efficiencies and identification of metastable energy levels.

This configuration permits development of a complete physical understanding of the absorption and emission processes in erbium (Er) and neodymium (Nd) doped glass hosts. Neodymium and erbium are chosen because they are the two most extensively studied dopants for laser fluorescence transitions. Nd-doped and Er-doped silicate glass studies form the basis of the reference.

Figure 17:
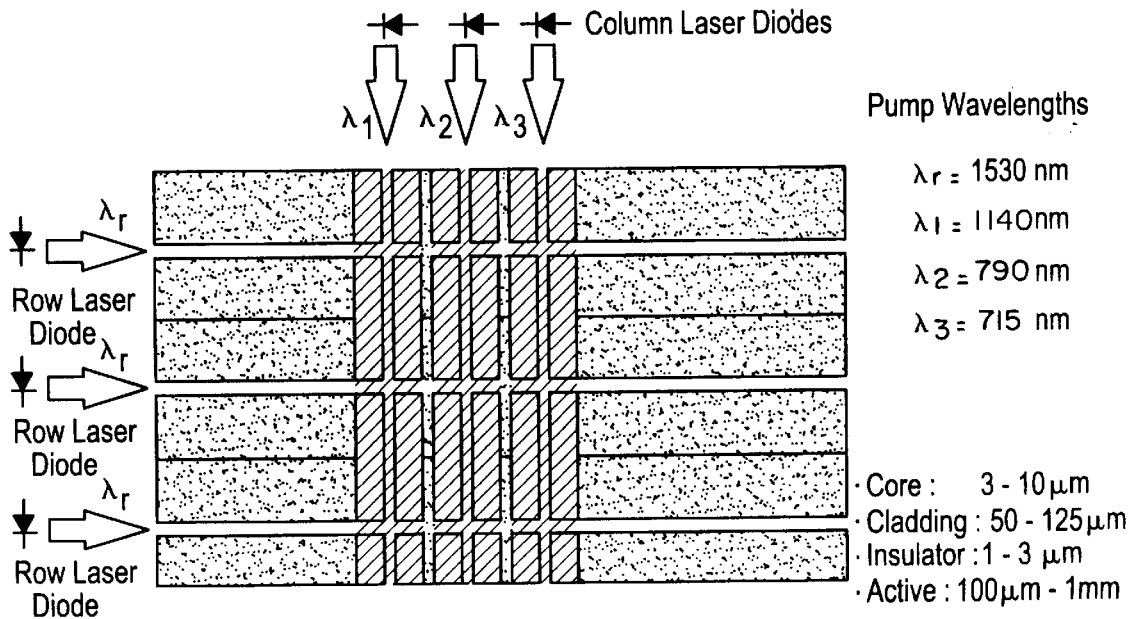
FIG. 17 shows a full-color 3×3 device.

FIG. 17 shows a full-color 3×3 device.

A 3×3 pixel prototype photoluminescent display device, is illustrated in FIG. 17. The device is full-color, continuously emitting red, green, and blue light. The following aspects of the technology are demonstrated:

Total solid-state construction.

Red, green, and blue fluorescence.

Principle of optical addressing.

The device is an optical display system that converts infrared power to emitted, visible light through upconversion-induced, photoluminescent processes. The device includes an $Er^{3+}$ doped $SiO_2$ host glass substrate, three row channels, three column channels, three row lasers operating at a wavelength of 1530 nm, one column laser operating at a wavelength of 1140 nm to upconvert the row excitation to red light, one column laser operating at a wavelength of 790 nm to upconvert the row excitation to green light, and one column laser operating at a wavelength of 715 nm to upconvert the row excitation to blue light.

It is not required that the lasers be integrated onto the glass substrate. Instead, the lasers may be coupled to the matrix by a fiber-optical connection. The device operation will remain the same as specified above.

Four digital control methods are useful for luminance and color modulation of the device. They are analog or continuous modulation, digital pulse width modulation, digital frequency or pulse rate modulation and digital binary modulation.

A standard photoluminescent pixel is formed by the intersection of one row waveguide and one column waveguide. The standard pixel will have a dimension of 1–5 micrometers per side. The standard pixel is illustrated conceptually in FIG. 1.

Figure 18:
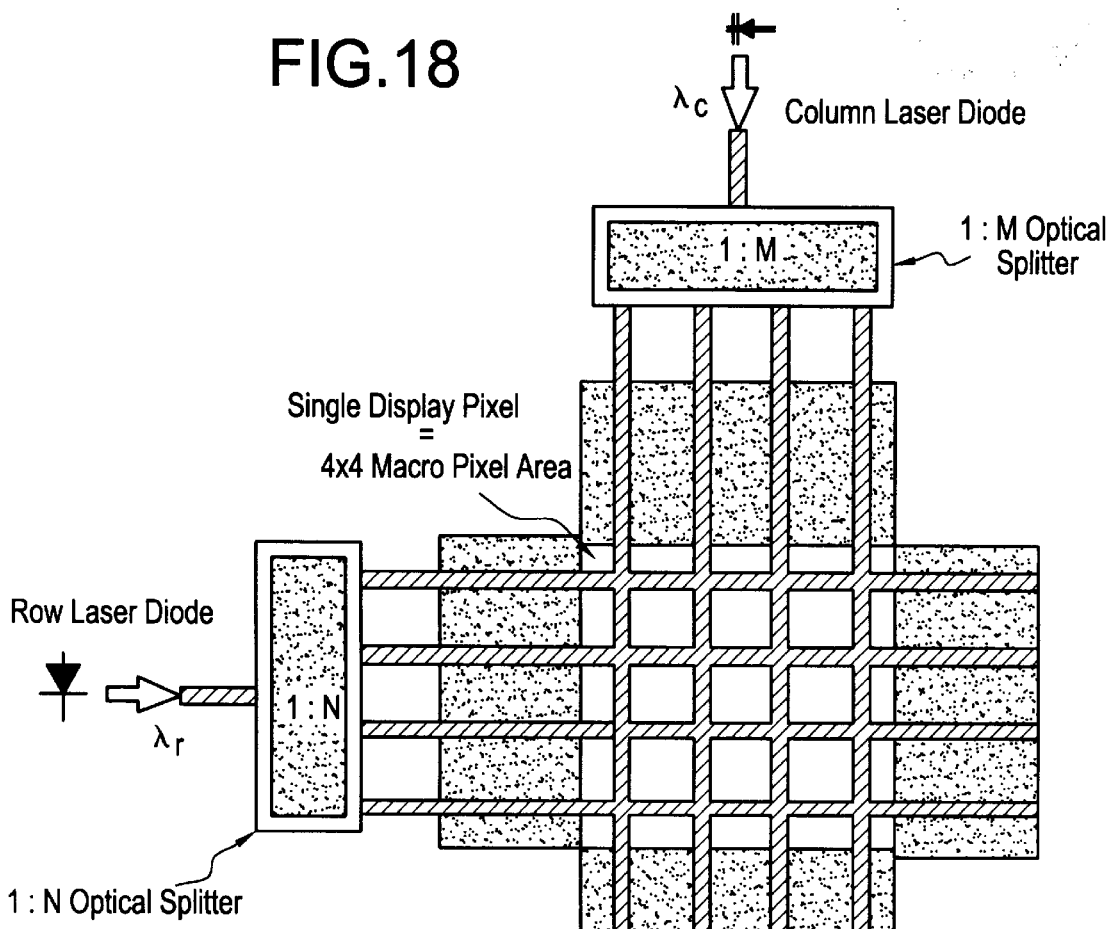
FIG. 18 schematically shows a 4×4 macro pixel design.

A photoluminescent macro pixel is formed by the intersection of N row and M column waveguides. The macro pixel design requires the waveguides be spatially separated by a distance that will permit power coupling between the waveguides. A 4×4 macro pixel representation is shown in FIG. 18. Illustrated by this alternative pixel embodiment, one row laser and one column laser excites the total macro pixel area. Power is divided across the waveguides by 1:N and 1:M optical splitters as shown. A macro pixel size is determined by the choice of the number of coupled row and column waveguides. Each physical waveguide junction is the size of a standard pixel.

FIG. 18 schematically shows a 4×4 macro pixel design.

Full-color display, optical addressing, and basic guided-wave photoluminescence are provided in a fully functional, flat-panel, video-rate, graphic display system. Larger display sizes may be fabricated with a 1024×1024 pixel array and diagonal display dimensions of 60 inches.

Applications of the technology for the defense and government sectors include helmet-mounted display units, aircraft cockpit display systems and global command center display systems. Many other applications in defense include avionics, submarine, tank, aircraft carrier, and ground-based portable and mobile systems.

Commercial sector applications are, for example, desk and lap-top personal computer displays and large-screen HDTV display markets.

The range of potential application includes military systems, personal computing, digital HDTV systems; multi-media, medical, and broadband image displays; advertising and large-screen display systems.

Figure 33:
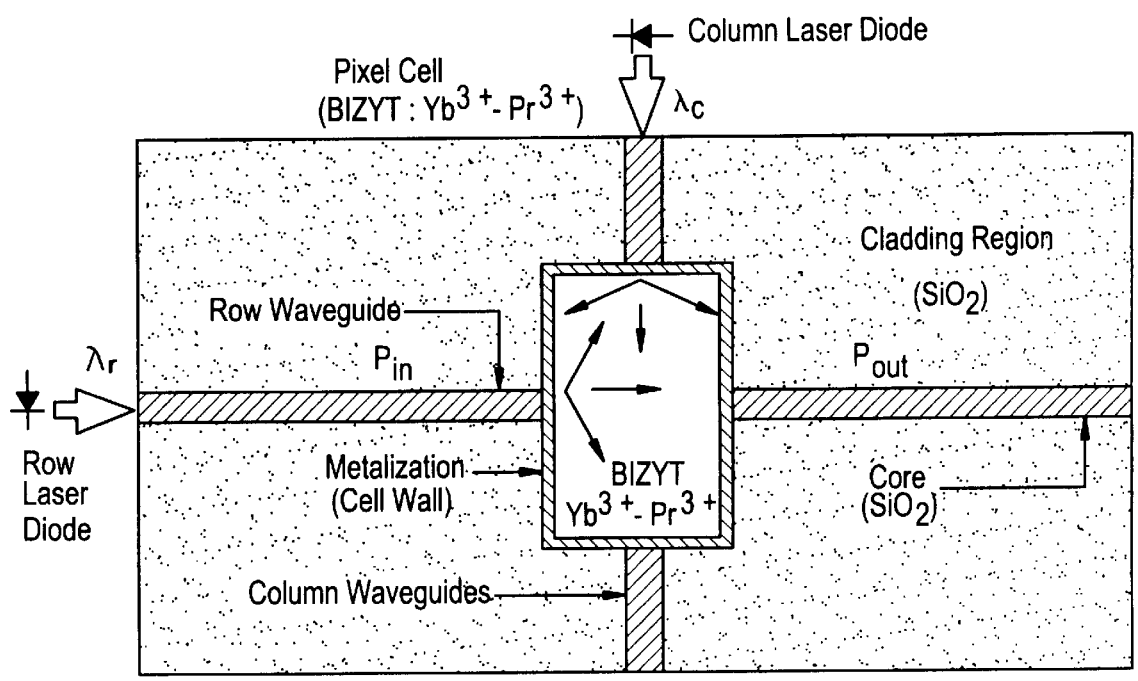
FIG. 33 shows a direct cavity, pixel cell embodiment of the present system.

Two fundamental pixel structures are preferred for use in the present system. Those structures are direct cavity and coupled cavity. The basic concept of direct cavity is shown in FIG. 33. The structure includes a pixel cell 51 containing a glass-based BIZYT:$YB^{3+}$—$Pr^{3+}$ phosphor. Each cell 51 is located at the junction of intersecting optical waveguides 53, 55. Each pixel 51 is enclosed by a cell wall 57 which forms an optical cavity 59 and provides pixel-to-pixel separation. The optical cavity 59 acts to trap, store, concentrate and build up optical power. That power is supplied to the cell 51 via the row and column waveguides 53, 55. Preferably, the waveguides have core regions ranging from 3 to 10 microns in width. Within the cell 51, intersecting optical beams force the phosphor into a luminescent state. Cell dimensions vary depending on exact display system requirements.

Figure 34:
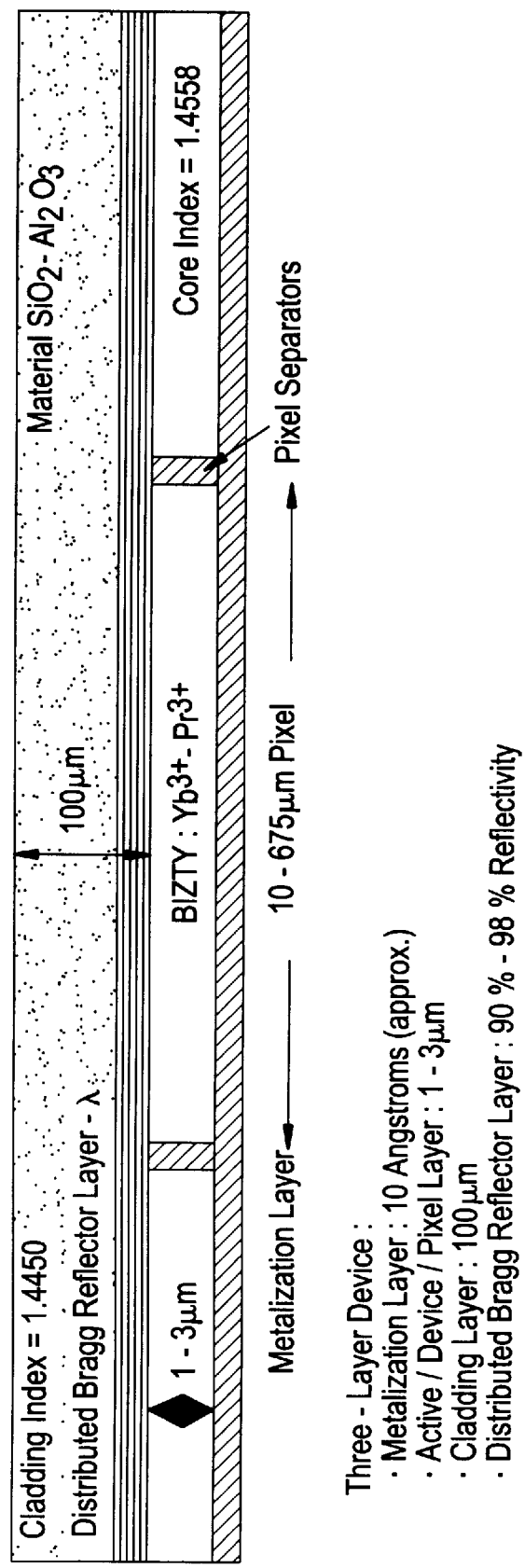
FIG. 34 is a cross-sectional view of a preferred three layer pixel cell.

FIG. 34 shows a direct cavity pixel structure. The structure includes a substrate 61, a distributed Bragg reflector layer 63, an active layer 65 and a metalization layer 67. The active layer 65 includes the optical waveguides 69, pixel cells 71 and pixel separators 73. The waveguide core 75, the cladding region 77 and the substrate 61 are preferably fabricated of $SiO_2$. The active region 65 is preferably fabricated of glass-based BIZYT:$Yb^{3+}$—$Pr^{3+}$ phosphor.

The substrate 61 functions as a cladding and provides the present invention with structural integrity. In preferred embodiments, the substrate 61 has a minimum thickness of 100 $\mu$m. The waveguide core 75 of the present invention preferably has a refractive index greater than the substrate 61.

As shown in FIG. 34, the distributed Bragg reflector layer 63 is positioned between the substrate 61 and the waveguides 69 and pixel cells 71. The Bragg reflector layer 63 confines components of the absorbed row power ($\lambda_r$) which are radiated vertical to the device layer.

The active layer 65 includes optical waveguides 69, pixel cells 71 and pixel separators 73. As shown in FIG. 34, the active layer 65 is preferably doped with BIZYT:Yb$^{3+}$—Pr$^{3+}$ phosphor and has a depth of about 1–3 μm. At 1–3 μm the active layer 65 induces single-mode propagation and creates high pump power intensities. Those high power intensities ensure efficient pumping of the BIZYT:Yb$^{3+}$—Pr$^{3+}$ ions. Active layer thickness may be adjusted for particular system requirements. FIGS. 35 and 36 show device performances as related to active layer depth.

The pixel cavity 71 of the present invention is formed from high reflectivity metal materials. The metalization layer 67 and the pixel separators 73 preferably are made of materials which provide a minimum reflectivity of 98%. The bottom metalization layer 67 functions to reflect fluorescent power out of the pixel and toward observers.

FIG. 37 shows a coupled cavity pixel structure. In that structure, fluorescent output occurs completely external to the waveguide paths. Power is transferred from the waveguides 77, 79 to the cavities 81 through evanescent coupling or tunneling. That coupling is controllable, and up to 100% of the power may be transferred.

As shown in FIG. 37, the coupled cavities 81 are doped with a photoluminescent phosphor. Photons from the row waveguides 77 and column waveguides 79 combine in the cavities 81 to fluoresce. The actual percent of photons that tunnel into the cavities 81 is controlled by the relative differences between the optical properties of the waveguides 77, 79 and those of the cavities 81.

Figure 19:
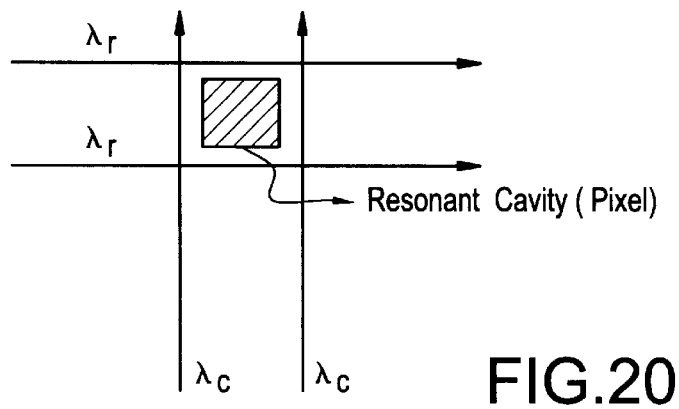
FIG. 19 is a schematic elevation of a resonant cavity pixel.

FIG. 19 is a schematic elevation of a resonant cavity pixel.

Different pixel embodiments exist. Resonant cavity pixels provide coupling and tunneling. The cavity contains photo active materials such as erbium. Power is coupled into the cavity from waveguides. The cavity is a doped, multi-mode cavity.

Figure 20:
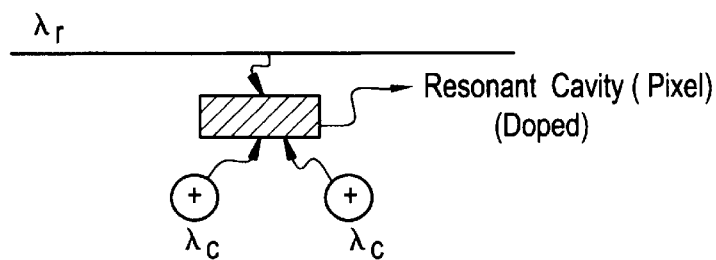
FIG. 20 is a schematic bottom view of the resonant cavity shown in FIG. 19.

FIG. 20 is a schematic bottom view of the resonant cavity shown in FIG. 19.

FIG. 21 is a schematic front elevation of a resonant cavity structure/couple power cavities with gray-scale or luminescence control. Two waveguides feed the cavity, permitting greater gray-scale control by phase modulation of λn, λc pairs.

FIG. 22 schematically shows a proximity waveguide pixel.

The structure provides more levels of dynamic gray-scale modulation.

FIG. 23 is a schematic bottom view of a pixel cavity and waveguides.

FIG. 24 shows photon distribution.

FIG. 25 schematically shows gray-scale control in adjacent pixel cavities.

FIG. 26 is a schematic bottom view of the structure shown in FIG. 25.

FIG. 27 is a schematic front view of a pixel cavity and waveguides.

FIG. 28 is a bottom view of the pixel cavity and waveguides shown in FIG. 27.

FIG. 29 is a schematic representation of a pixel cavity and individual color waveguides.

Figure 30:
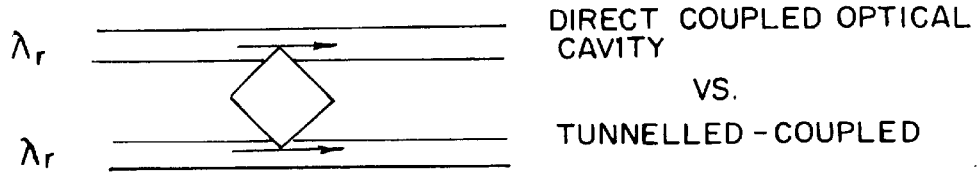
FIG. 30 is a schematic front view of a direct coupled optical cavity.

FIG. 30 is a schematic front view of a direct coupled optical cavity.

Figure 31:
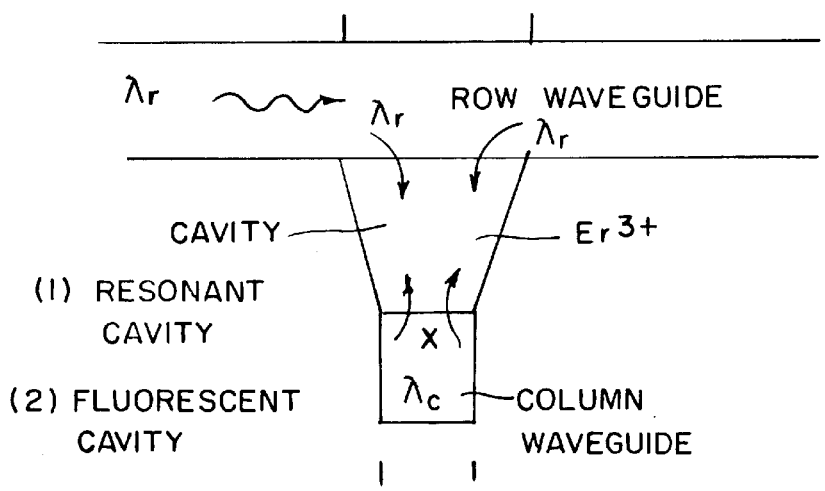
FIG. 31 shows photons from row and column wave radiating into the interconnection doped cavity. Those radiated photons combine in the cavity to photoluminescence or fluoresce. The amount of radiated photons is proportional to aperture size.

As shown in FIG. 31, photons from row and column wave radiate into the interconnection doped cavity. These radiated photons combine in the cavity to photoluminescence or fluoresce. The amount of radiated photons is proportional to aperture size.

Figure 32:
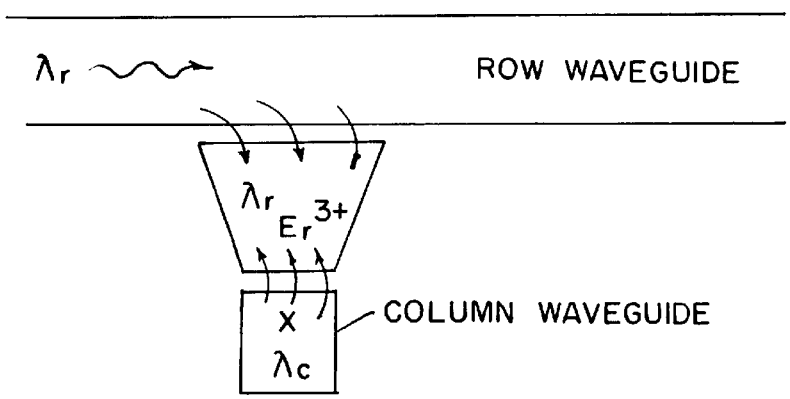
FIG. 32 shows the photons from the row and column waves coupled/tunnelled into the fluorescent cavity. The photons combine in the cavity to photoluminescence or fluoresce. The percentage of photons that tunnel through is proportionate to the optical distance separating the waveguide cavity.

In FIG. 32, the photons from the row and column waves couple/tunnel into the fluorescent cavity. The photons combine in the cavity to photoluminescence or fluoresce. The percentage of photons that tunnel through is proportionate to the optical distance separating the waveguide cavity.

The structures shown in FIG. 19 and sequential have benefits of no overlapping waveguides, no row-column coupling, no intersecting waveguides, high pixel densities, better control over flexibility of gray-scale and color, improved luminescence control, and improved color control.

Preferred embodiments of the present system include heavy metal fluoride glass based phosphors having $BaF_2$, $ZnF_2$, $YF_3$ and $ThF_4$ (BIZYT). The phonon energy of BIZYT-type glasses is less than 450 cm$^{-1}$. The low phonon energy of the BIZYT glass results in improved emission efficiency. When BIZYT glass is doped with trivalent praseodymium, the combination functions as either a red or a blue phosphor. That phosphor has a composition of Yb$^{3+}$ as the sensitizer material and Pr$^{3+}$ as the activator.

Figure 38:
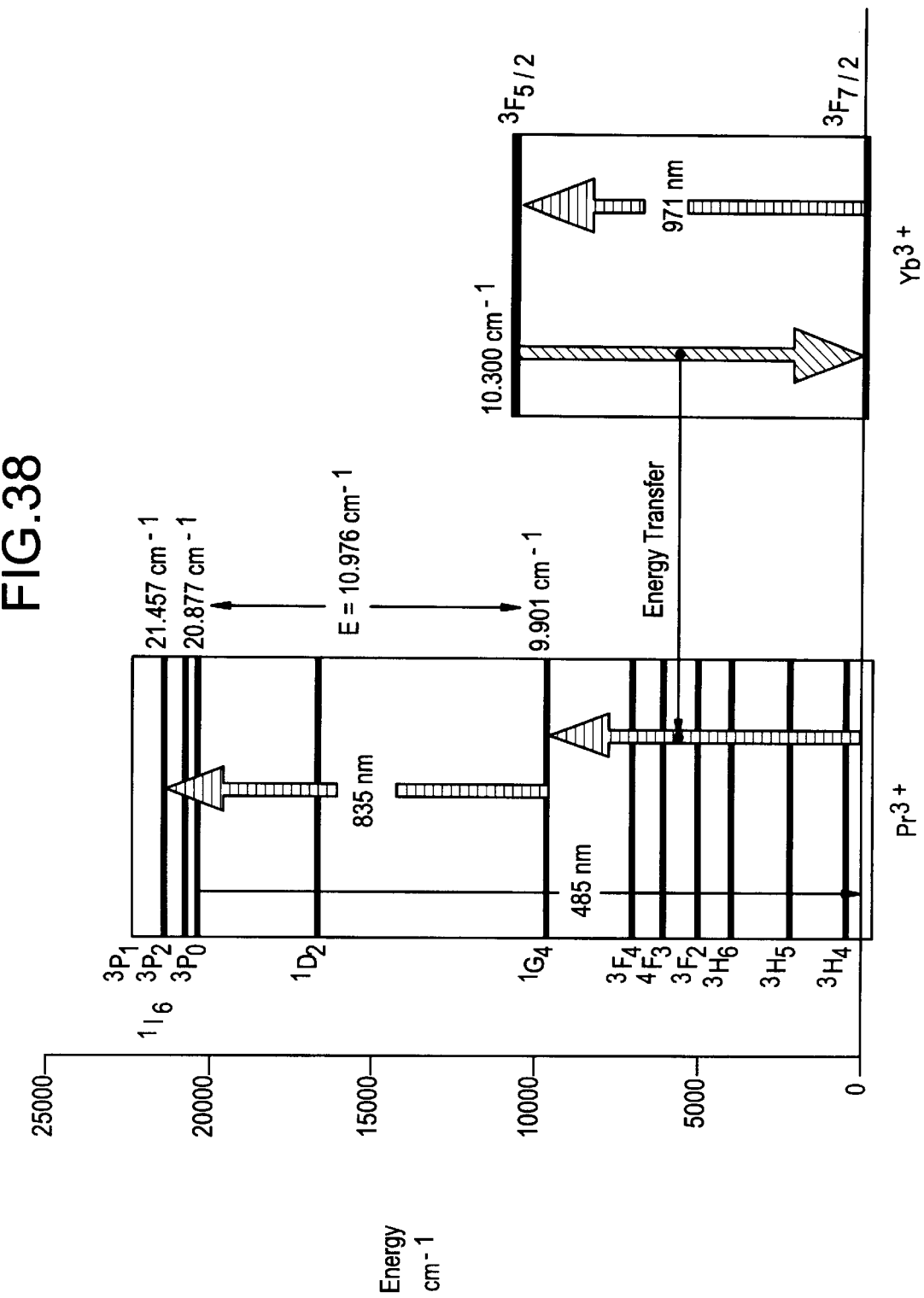
FIG. 38 shows an energy diagram for a BIZYT:$Yb^{3+}$–$Pr^{3+}$ embodiment of the present system having 485 nm emissions.

FIG. 38 shows the energy diagram and excitation process of the BIZYT:Yb$^{3+}$—Pr$^{3+}$ phosphor responsible for 485 nm emissions. The phosphor operates through the application of a 971 nm row pump beam ($\lambda_r$) to populate the $^2F_{5/2}$ state of the Yb$^{3+}$ ions. The convergent application of an upconversion column pump beam ($\lambda_c$) of 835 nm induces blue-green fluorescent emissions at 485 nm.

Figure 39:
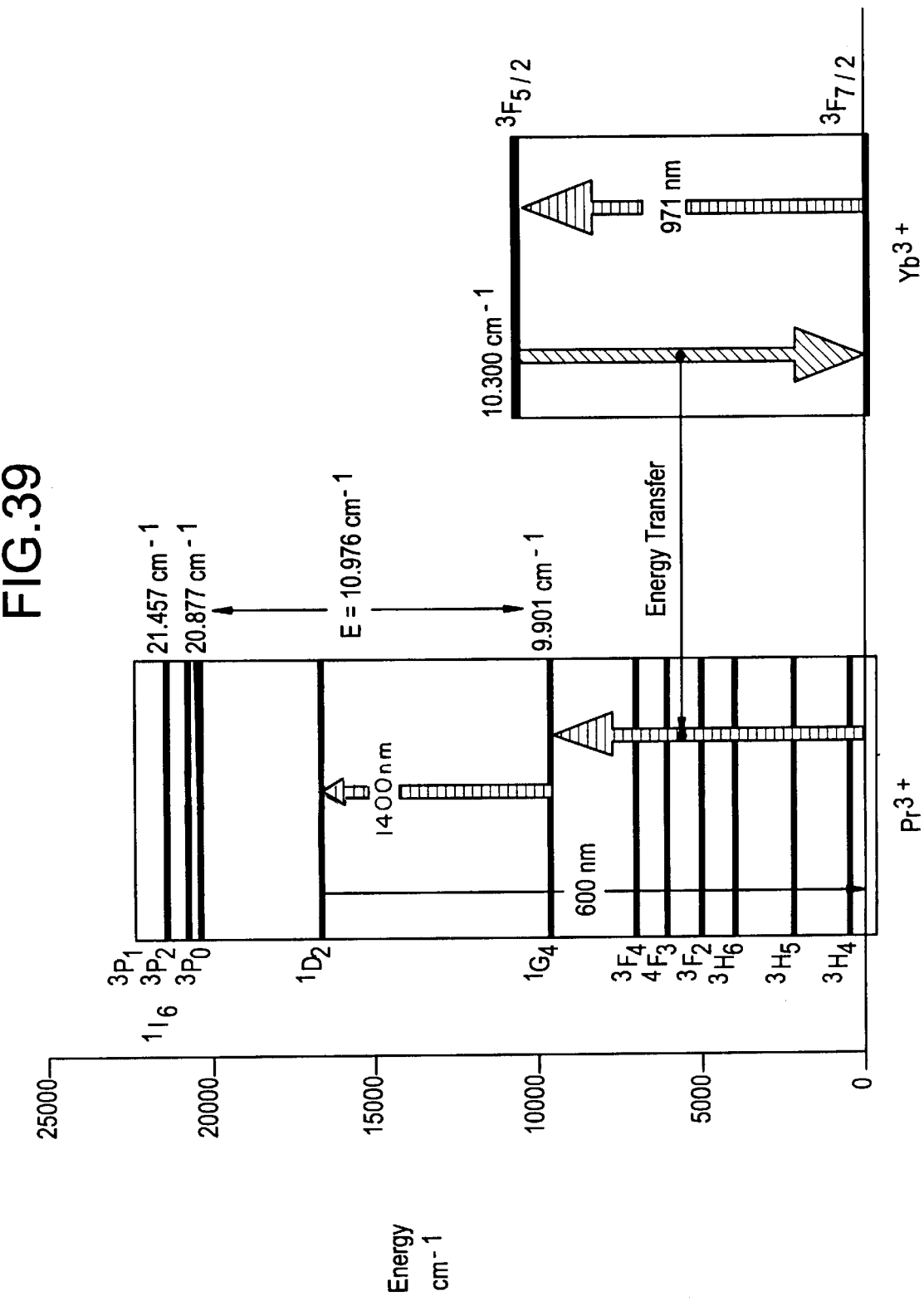
FIG. 39 shows an energy diagram for a BIZYT:$Yb^{3+}$–$Pr^{3+}$ embodiment of the present system having 600 nm emissions.

FIG. 39 shows the energy diagram and excitation process of the BIZYT:Yb$^{3+}$—Pr$^{3+}$ phosphor responsible for 600 nm emissions. The phosphor operates through the application of a 971 nm row pump beam ($\lambda_r$) to populate the $^2F_{5/2}$ state of the Yb$^{3+}$ ions. The convergent application of an upconversion column pump beam ($\lambda_c$) of 1400 nm induces red-orange fluorescent emissions at 600 nm.

The praseodymium ions are indirectly excited to the $^1G_4$ energy level by an energy transfer from the Yb$^{3+}$ ions excited by the 971 nm row pump beam. The column laser excites the $^1G_4$ electronic population to the thermally coupled $^3P_0$, $^3P_1$ and $^1I_6$ levels. The decay of those ions to the $^3H_4$ level provides the source of the 485 nm emission. For the 600 nm emission, the column laser excites the $^1G_4$ electronic population to the $^1D_2$ level. The decay of those ions to the $^3H_4$ level provides the source of the 600 nm emission.

The potential for visible fluorescence from and the physical processes involved in the praseodymium phosphor is illustrated in the energy diagrams shown in FIGS. 104 and 105. Assuming a three-level system using a nonsaturating pump, the single pixel output power without confinement is approximated as follows:

$$F_{31} = \beta_{31} E_{31} \tau_{21} \left(\frac{\sigma_{12} I_{12}}{E_{12}}\right)\left(\frac{\sigma_{23} I_{23}}{E_{23}}\right) N_0 \quad \text{watts/(cm}^{3*}\text{second)} \tag{4}$$

$N_0$: Density of phosphor ions per cm$^3$ $\tau_{21}$: Lifetime of metastable level 2 in seconds $\beta_{31}$: Probability that once a center is excited to level 3 it will decay radiatively by emitting a photon of wavelength $\lambda_{31}$ $\sigma_{12}$: Absorption cross-section in cm$^2$ from level 1 to level 2

$\dfrac{I_{12}}{E_{12}}$:

Average pump power densities in photons/(cm$^2 \times$second) from level 1 to 2

$\sigma_{23}$: Absorption cross sections in cm$^2$ from level 2 to level 3

$$\frac{I_{23}}{E_{23}}:$$

Average pump power densities in photons/(cm²×second) from level 2 to 3

Power confinement in the pixel cavity modifies the fluorescent output by the introduction of three process enhancement terms as shown:

$$F_{31} = \Gamma_{31}\beta_{31}E_{31}\tau_{21}\Gamma_{12}\left(\frac{\sigma_{12}I_{12}}{E_{12}}\right)\Gamma_{23}\left(\frac{\sigma_{23}I_{23}}{E_{23}}\right)N_0 \quad (5)$$

watts/(cm³*second)

Figure 40:
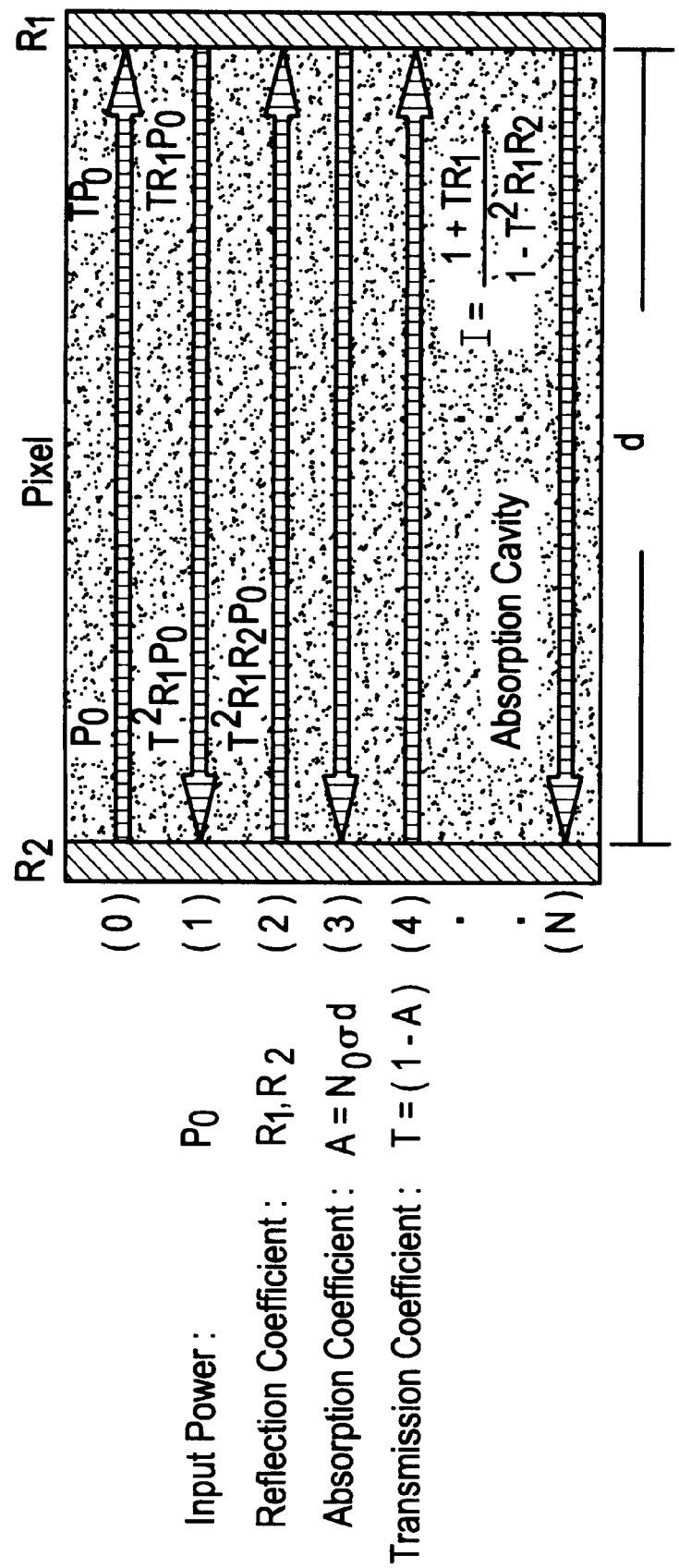
FIG. 40 shows simple intensity enhancement in the pixel cavity of the present system.

$\Gamma_{12}$ and $\Gamma_{23}$ process enhancements result from the resonant absorption of input pump power at the respective wavelengths. Those terms are proportional to the cavity quality factor, Q, and are as defined:

$\Gamma_{12}$: Absorption enhancement of the $I_{12}$ beam resulting from the cavity's Q at the wavelength $\lambda_{12}$ $\Gamma_{23}$: Absorption enhancement of the $I_{23}$ beam resulting from the cavity's Q at the wavelength $\lambda_{23}$ FIG. 40 illustrates the steady-state $\Gamma_{12}$ and $\Gamma_{23}$ intensity enhancement within the cavity. Those terms are approximated for a simple cavity as follows:

$$\Gamma_{12} = \frac{1 + T_{12}R_1}{1 - T_{12}^2 R_1 R_2} \quad (6)$$

$$\Gamma_{23} = \frac{1 + T_{23}R_1}{1 - T_{23}^2 R_1 R_2} \quad (7)$$

The $\Gamma_{31}$ process enhancement results from emission rate enhancements in a resonant microcavity. That term is proportional to the cavity quality factor, Q, and is as defined:

$\Gamma_{31}$: Spontaneous emissions enhancement of the $F_{31}$ output resulting from resonant microcavity confinement of the output emission at wavelength $\lambda_{31}$ The formula for $\Gamma_{3l}$ intensity is approximated by:

$$\Gamma_{31} = \frac{(1 + \sqrt{R_2})^2 (1 - R_1)}{(1 - \sqrt{R_1 R_2})^2} \quad (8)$$

For a simple planar cavity structure, $R_1$ and $R_2$ are the reflectivities of the two reflectors forming the cavity output mirrors. $R_1$ is the reflectivity of the light-exit reflector.

Using the direct cavity structure of FIG. 101, the fluorescent output is generated in the direct path of the beam and by the power trapped in the cavity. The difference between $P_{in}$ and $P_{out}$ through the pixel is power trapped, stored or absorbed in the cell. The combination of the direct beam power plus trapped or stored power provides the intensity excitation of the pixel.

The power transmission coefficient of the cell is preferably varied from $T_{3 \mu m}$=0.99745 for a 3 µm core to $T_{10 \mu m}$= 0.99896 for a 10 µm core. With a power transmission coefficient of $T_{3 \mu m}$, the 3 dB point of the incident power corresponds to the 270th cell. With a power transmission coefficient of $T_{10 \mu m}$, the 3 dB point of the incident power corresponds to the 665th cell.

To achieve sufficient power to each cell, the device preferably has a simultaneous pump from both ends of the waveguide. The total incident power, $P_{inK}$, supplied to the Kth cell, is:

$P_{inK}=P_{source}\cosh[\frac{1}{2}(\ln T)(N-2K)]$, where $P_{source}$: source or laser peak power N: total number of pixels in a column or row T: cell transmission coefficient (9)

To achieve uniform power to each cell, the present system preferably has the waveguide width, i.e. transmission coefficient, vary as $\text{sech}[\frac{1}{2}(\ln T)(N-2K)]$.

The pixel cell, optical cavity structure of the present invention functions to confine and to concentrate optical power to achieve higher power efficiency. The optical cavity reduces pump powers required for a given fluorescent output because, first, the intensity scales inversely with the pixel transverse cavity area for a fixed input power, and second, the efficiency is enhanced by the storage, trapping and multiple reflections of the unabsorbed input power. FIGS. 35 and 36 demonstrate the efficiency of the present invention. Additionally, the present invention preferably shares the semiconductor laser diodes as row and column device drivers, which increases driver efficiency and achieves excellent economics of the active components.

The intensity enhancement product for efficient system operation is as follows:

$$\Gamma_{12}\Gamma_{23}\Gamma_{31} \geq \frac{F_{31}E_{12}E_{23}}{\beta_{31}E_{31}\tau_{21}\sigma_{12}I_{12}\sigma_{23}I_{23}N_0} \quad (10)$$

Figure 41:
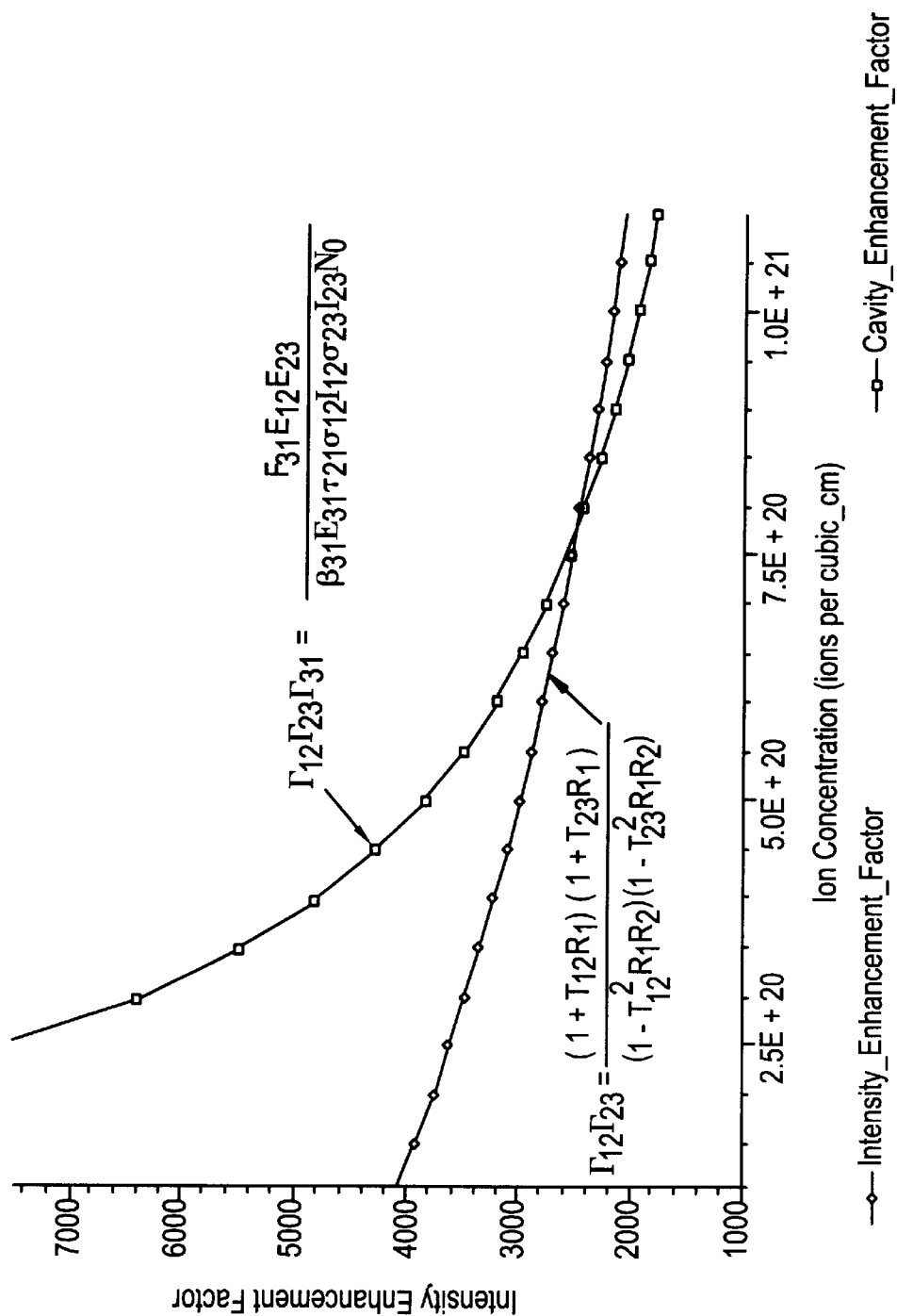
FIG. 41 graphically represents intensity enhancement factors for a 21 inch embodiment of the present system.

The amount of intensity enhancement needed in the pixel is determined by the specification of the output versus target input as follows:

(1) $F_{31}$—proportional to requires peak display output in candela/square meter (2) $I_{12}$ and $I_{23}$—proportional to target peak pixel input $P_{12}$ and $P_{23}$ in watts/pixel The pixel performance requirements are determined by the relationships provided in the above equation. The cavity enhancement and the required intensity enhancement for a 675 µm×675 µm pixel versus the ion concentration are shown in FIG. 41. FIG. 41 illustrates that at an ion concentration exceeding $7.5 \times 10^{+20}$ ions per cm³ the cavity enhancement to achieve a 25% pixel efficiency satisfies the requirements of the above equation. Illustrated in FIG. 41 are plots of Equation 10 and the product of Equations 6 and 7.

Figure 42:
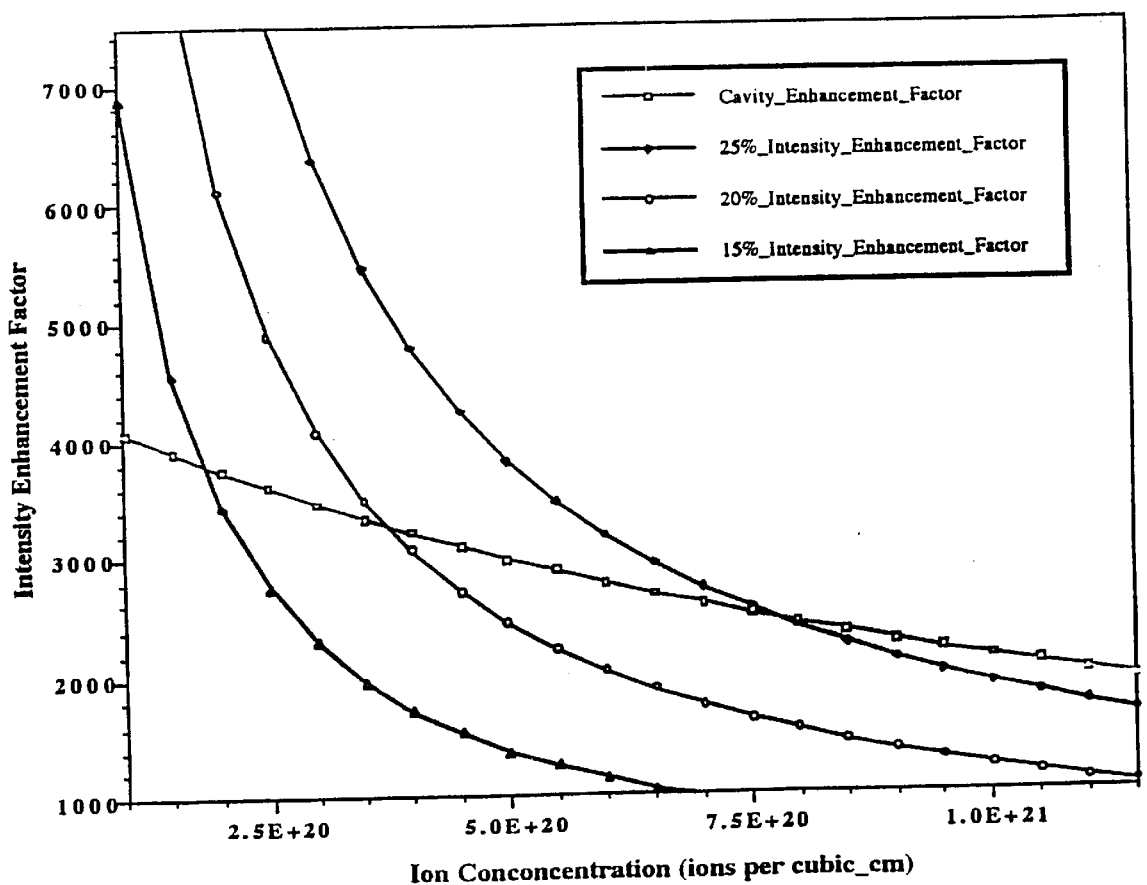
FIG. 42 shows the ion concentration versus intensity enhancements to achieve 25%, 20% and 15% pixel efficiencies.

FIG. 42 shows the ion concentration versus intensity enhancements to achieve 25%, 20% and 15% pixel efficiencies.

FIG. 35 shows the device characteristics, power requirements and projected performances for a 21 inch display with a steady state peak output of 200 candela/meter² versus an active layer depth from 1 to 3 µm. The resolution is 640×480 pixels. For FIG. 35, a greenish-blue output at wavelength of 485 nm is assumed, $Pr^{3+}$ based phosphors are employed, and the cavity reflectivity is fixed at 98.5%, resulting in an approximate 2100 x intensity enhancement. FIG. 35 illustrates that pixel efficiency of 25% for a corresponding pixel with a depth of 1 µm is obtainable. A system efficiency of 67 lumens/watts is achievable and the maximum power required is 5.26 watts.

FIG. 36 shows the device characteristics, power requirements and projected performances for a one inch display with a steady-state peak output of 200 candela/meter² versus an active layer depth from 1 to 3 µm. The resolution is 640×480 pixels. For FIG. 36, a greenish-blue output at wavelength of 485 nm is assumed, $Pr^{3+}$ based phosphors are employed, and the cavity reflectivity is fixed at 98.5%, resulting in an approximate 3500 x intensity enhancement. FIG. 36 illustrates that pixel efficiency of 5% for a corresponding pixel with a depth of 1 µm is obtainable. A system efficiency of 14 lumens/watts is achievable and the maximum power required is 0.13 watts.

Without the benefit of optical cavity confinement, BIZYT-type phosphor efficiencies of 1.2% at 300K have been demonstrated. Augmented by a cavity intensity enhancement of 21 times, a total pixel efficiency of 25%—171 lumens/watt—as illustrated in the 21 inch model is achievable.

From FIGS. 35 and 36, it is clear that the one inch display exhibits much lower efficiency in comparison to the 21 inch display. At the smaller dimensions the pixel efficiency approaches the efficiency of the phosphor. Efficiency enhancement is the result of optical confinement. At the larger pixel dimensions, the Q of the cavity and the optical absorption path length significantly enhance the pixel efficiency. That comparative difference in display performance is the result of two factors:

reduced absorption in the phosphor as a result of a decrease in absorption lengths provided by the smaller pixel, and increased absorption in the cavity walls as a result of the increased number of wall reflections because of the shortened cavity lengths of the smaller pixel.

In preferred embodiments, the present system includes low cost laser diode device drivers. Possible driver embodiments of the present system include edge-emitting laser diodes, edge-emitting laser arrays fabricated on fully integrated silicon substrates and laser arrays fabricated as fully integrated devices that are capable of transfer to the display substrate on wafer scales.

These and further and other objects and features of the invention are apparent in the disclosure, which includes the above and ongoing written specification, with the drawings.

While the invention has been described with reference to specific embodiments, modifications and variations of the invention may be constructed without departing from the scope of the invention.

I claim:

1. A flat-panel display apparatus comprising a matrix having an array of intersecting and generally perpendicular row waveguides and column waveguides, wherein intersections of the row waveguides and the column waveguides are doped with a photo-active material to form photoluminescent pixels at the intersections of the row waveguides with the column waveguides, and independently selectable photonic power sources for delivering photonic power to selected pixels through the row waveguides and the column waveguides.

2. The apparatus of claim 1, wherein the photonic power sources are selected from the group consisting of semiconductor lasers, light-emitting diodes and miniature solid-state lasers.

3. The apparatus of claim 1, wherein the photonic power is provided at infrared wavelengths.

4. The apparatus of claim 1, wherein the photonic power sources further comprise (N+M) power sources, where N is a number of row waveguides and M is a number of column waveguides.

5. The apparatus of claim 1, wherein the photonic power sources further comprise pump sources for selecting pixels and upconversion sources for selecting luminescent qualities of the selected pixels.

6. The apparatus of claim 5, wherein the pump sources deliver photonic power to the pixels through row waveguides, and wherein the upconversion sources deliver photonic power to the pixels through the column waveguides.

7. The apparatus of claim 5, wherein the upconversion sources and the pump sources deliver photonic power to the pixels through the column waveguides.

8. The apparatus of claim 1, wherein the waveguides are made of materials selected from the group consisting of transparent fluoride crystals and glass, and wherein the photo-active material further comprises materials selected from the group consisting of rare-earth ions, transition metals and combinations thereof.

9. The apparatus of claim 1, wherein the matrix further comprises a substrate, an active layer formed on the substrate, a reflector layer positioned between the substrate and the active layer and a metalization layer positioned on an undersurface of the active layer, and wherein the row waveguides, the column waveguides and the photoluminescent pixels are formed in the active layer.

10. The apparatus of claim 9, wherein the substrate is made of a material selected from the group consisting of glass and polymers.

11. The apparatus of claim 10, wherein the substrate is made of glass selected from the group consisting of silica glasses, heavy metal, phosphate glasses, oxide glasses and fluoride glasses, the fluoride glasses further comprising zirconium fluoride, barium fluoride, strontium fluoride and lithium fluoride.

12. The apparatus of claim 10, wherein the row waveguides and the column waveguides are channel waveguides.

13. The apparatus of claim 9, wherein the substrate, row waveguides and column waveguides are made of low loss glass materials.

14. The apparatus of claim 1, wherein the row waveguides have spatial geometries for propagating streams of photonic power having first wavelengths, wherein the column waveguides have spatial geometries for propagating streams of photonic power having second wavelengths and for rejecting streams of photonic power having the first wavelengths, and wherein the first wavelengths are greater than the second wavelengths.

15. The apparatus of claim 1, wherein the row waveguides have spatial geometries for propagating streams of photonic power having first wavelengths, wherein the column waveguides have spatial geometries for propagating streams of photonic power having second wavelengths and for rejecting streams of photonic power having the first wavelengths, and wherein the first wavelengths are less than the second wavelengths.

16. The apparatus of claim 1, wherein the intersections of the row waveguides and column waveguides are orthogonal.

17. The apparatus of claim 1, wherein the column waveguides and row waveguides are of different geometric dimensions for minimizing row-to-column power coupling.

18. The apparatus of claim 1, wherein the photo-active material includes dopants selected from the group consisting of rare-earth ions, transition metals and combinations thereof.

19. The apparatus of claim 18, wherein the dopants are selected from the group consisting of erbium, holmium, thulium, praseodymium, neodymium, ytterbium, ytterbium:erbium, ytterbium:thulium, thulium:praseodymium, chromium, thallium, manganese, vanadium, iron, cobalt, nickel, chromium:neodymium and chromium:erbium.

20. The apparatus of claim 1, wherein the photonic power sources are monolithically integrated onto the matrix.

21. The apparatus of claim 1, wherein the photonic power sources are coupled to the matrix by fiber-optical connections.

22. The apparatus of claim 1, wherein the photonic power sources further comprise pump sources for selecting pixels and upconversion sources for selecting luminescent qualities of the selected pixels, and further comprising a digital control connected to the upconversion sources for modulating luminance and color characteristics of the pixel, the control selected from the group consisting of an analog or continuous modulator, a digital pulse width modulator, a digital frequency or pulse rate modulator and a digital binary modulator.

23. The apparatus of claim 1, wherein the matrix further comprises a substrate having an active layer, wherein the intersecting row waveguides and column waveguides and pixels are provided in the active layer, wherein the pixels further comprise cells surrounded by side walls to form an optical cavity, and further comprising a distributed Bragg reflector layer positioned between the substrate and the waveguides and pixel cells and a metalization layer positioned on an underside of the cells.

24. The apparatus of claim 23, wherein the substrate functions as a cladding, wherein the waveguides have cores, wherein the waveguide cores and the substrate are made of silicon oxide, and wherein the optical cavity is made of glass-based $BIZYT:Yb^{3+}-Pr^{3+}$ phosphor.

25. The apparatus of claim 24, wherein a refractive index of the substrate is less than refractive indices of the waveguide cores.

26. The apparatus of claim 1, wherein the matrix further comprises cavities coupled to the waveguides, the cavities positioned at corners where row waveguide and column waveguides intersect, and wherein the cavities are doped with photo-active material.

27. The apparatus of claim 1, wherein the matrix is made of BIZYT glass, and wherein the photo-active material is trivalent praseodymium.

28. A method for converting signals into light images comprising the steps of providing a display having an array of intersecting row waveguides and column waveguides, doping intersecting regions of the waveguides with a photo-active material, selecting pixels by delivering photonic power to selected pixels through the row waveguides, exciting the selected pixels into non-radiative, intermediate metastable states, delivering photonic power to the selected pixels through the column waveguides, and exciting the selected pixels into visible photoluminescent states.

29. The method of claim 28, wherein exciting the pixels into non-radiative, intermediate metastable states further comprises creating localized, electronic population excitations at the selected pixels.

30. The method of claim 28, wherein exciting the pixels into non-radiative, intermediate metastable states further comprises bombarding electrons in the selected pixels with photons and exciting the electrons from ground level states to first excited, metastable states, and wherein exciting the selected pixels into visible photoluminescent states further comprises bombarding the electrons in the first excited states, upconverting the electrons to second, higher energy, non-metastable states, and allowing the electrons to decay spontaneously to the ground level for producing localized photoluminescence.

31. The method of claim 28, wherein providing a display further comprises providing a substrate and forming intersecting row waveguides and column waveguides in the substrate using photolithographic techniques.

32. The method of claim 28, wherein delivering photonic power to the selected pixels through the column waveguides further comprises controlling photoluminescent characteristics of the selected pixels.

33. The method of claim 32, wherein the characteristics are selected from the group consisting of intensity, brightness and color.

34. The method of claim 32, wherein controlling photoluminescent characteristics of the selected pixels further comprises digitally controlling photonic power sources by a modulation technique selected from the group consisting of analog or continuous modulation, digital pulse width modulation, digital frequency or pulse rate modulation and digital binary modulation.

35. The method of claim 28, wherein exciting the selected pixels into visible photoluminescent states further comprises activating the selected pixels on a pixel-by-pixel basis.

36. The method of claim 28, wherein providing a display further comprises manufacturing a display matrix having intersecting waveguides and photoluminescent pixels using a technique selected from the group consisting of ion exchange, flame hydrolysis deposition, vapor deposition and thin film techniques.

37. The method of claim 28, wherein providing a display further comprises depositing two successive glass particle layers of buffer and core by flame hydrolysis, consolidating the glass layers by applying heat, creating waveguides in the consolidated glass by RF magnetron sputtering, photolithographic pattern definition and reactive ion etching and covering the consolidated glass having the waveguides with silicon oxide over-cladding.

* * * * *